(12) United States Patent
Bohmer et al.

(10) Patent No.: US 12,059,755 B2
(45) Date of Patent: Aug. 13, 2024

(54) SYSTEM AND METHODS OF SMART WELDING OPERATIONS

(71) Applicant: ROTORWELD, LLC, West Palm Beach, FL (US)

(72) Inventors: John Bohmer, West Palm Beach, FL (US); Avery Marriott, Hobe Sound, FL (US)

(73) Assignee: Rotorweld, LLC, West Palm Beach, FL (US)

( * ) Notice: Subject to any disclaimer, the term of this patent is extended or adjusted under 35 U.S.C. 154(b) by 518 days.

(21) Appl. No.: 17/184,332

(22) Filed: Feb. 24, 2021

(65) Prior Publication Data

US 2021/0260683 A1  Aug. 26, 2021

Related U.S. Application Data

(60) Provisional application No. 62/980,672, filed on Feb. 24, 2020.

(51) Int. Cl.
| | |
|---|---|
| *B23K 9/167* | (2006.01) |
| *B23K 9/095* | (2006.01) |
| *B23K 9/10* | (2006.01) |
| *B23K 9/32* | (2006.01) |
| *B23K 37/053* | (2006.01) |
| *G06F 3/02* | (2006.01) |
| *H04W 4/80* | (2018.01) |

(52) U.S. Cl.
CPC ............ *B23K 9/167* (2013.01); *B23K 9/0956* (2013.01); *B23K 9/1087* (2013.01); *B23K 9/326* (2013.01); *B23K 37/0538* (2013.01); *G06F 3/0202* (2013.01); *H04W 4/80* (2018.02)

(58) Field of Classification Search
CPC .............. B23K 37/0533; B23K 37/053; B23K 37/0538; B23K 2101/06; B23K 2101/10; B23K 37/047; B23K 9/0282; B23K 2101/04; B23K 2101/12; B23K 31/027; B23K 37/0258; B23K 37/0452; B23K 37/0531; B23K 9/0286; B23K 9/0953; B23K 9/0956; B23K 9/1062; B23K 9/1087; B23K 9/167; B23K 9/326
USPC ................................................... 219/130, 59
See application file for complete search history.

(56) References Cited

U.S. PATENT DOCUMENTS

| | | | |
|---|---|---|---|
| 2010/0051586 A1* | 3/2010 | Guerrina .............. | B23K 9/0286 219/59.1 |
| 2015/0273610 A1* | 10/2015 | Denis ................... | B23K 9/1087 219/132 |
| 2020/0049584 A1 | 2/2020 | Alghamdi | |

FOREIGN PATENT DOCUMENTS

| | | |
|---|---|---|
| EP | 3132886 | 2/2017 |
| KR | 20190142867 | 12/2019 |

* cited by examiner

*Primary Examiner* — Vy T Nguyen
(74) *Attorney, Agent, or Firm* — McHale & Slavin, P.A.

(57) ABSTRACT

A smart welding system and smart welding process which integrates technology to increase performance and safety in welding operations.

17 Claims, 26 Drawing Sheets

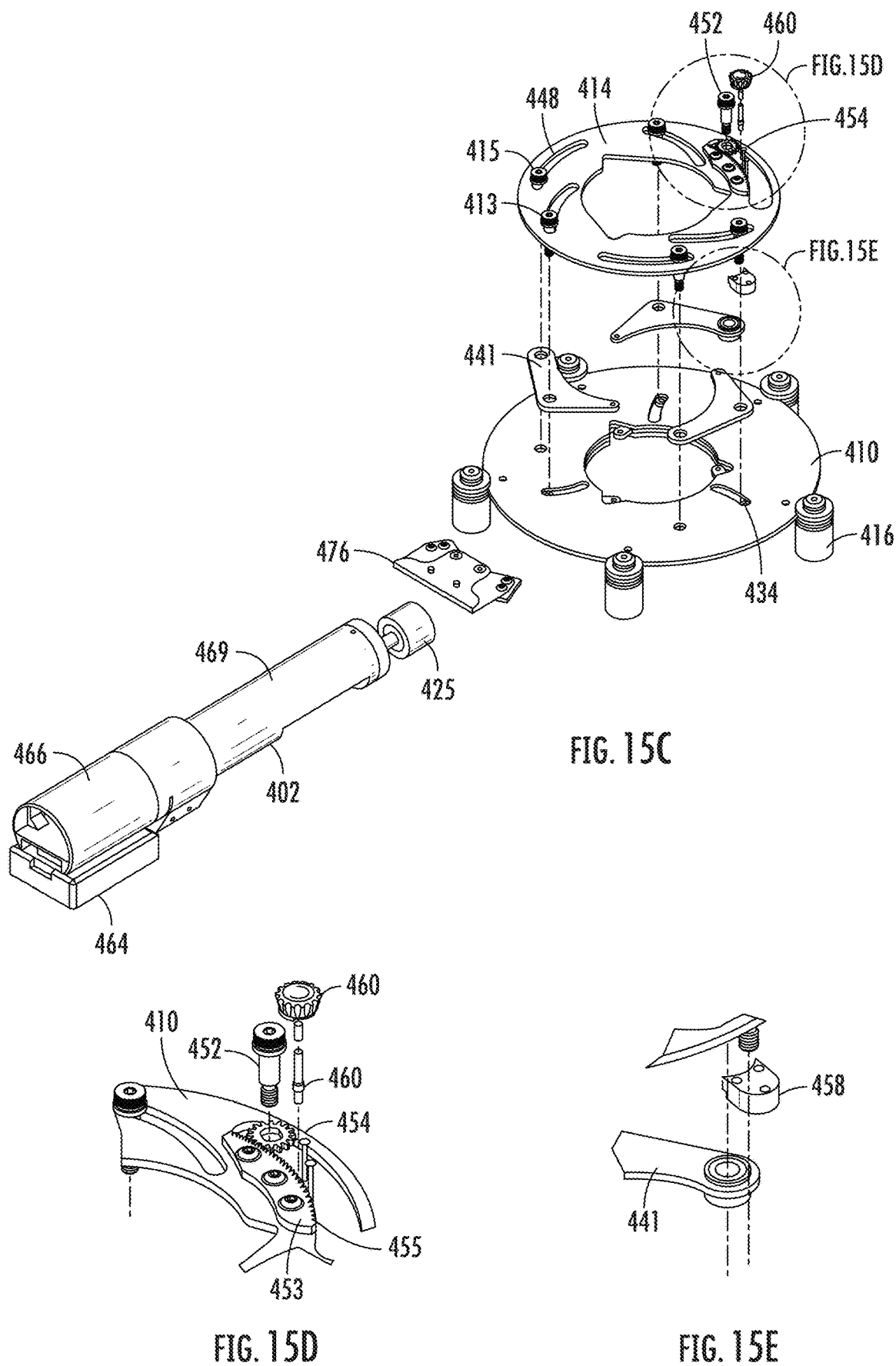

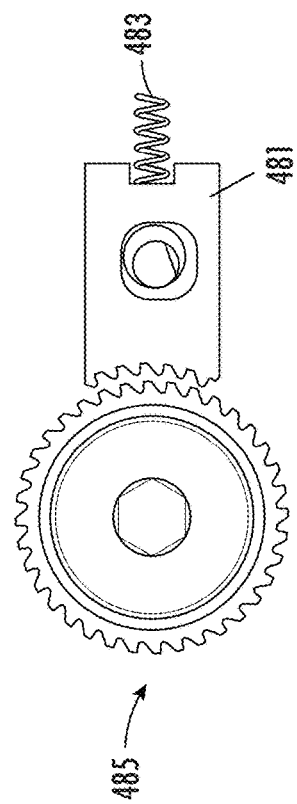
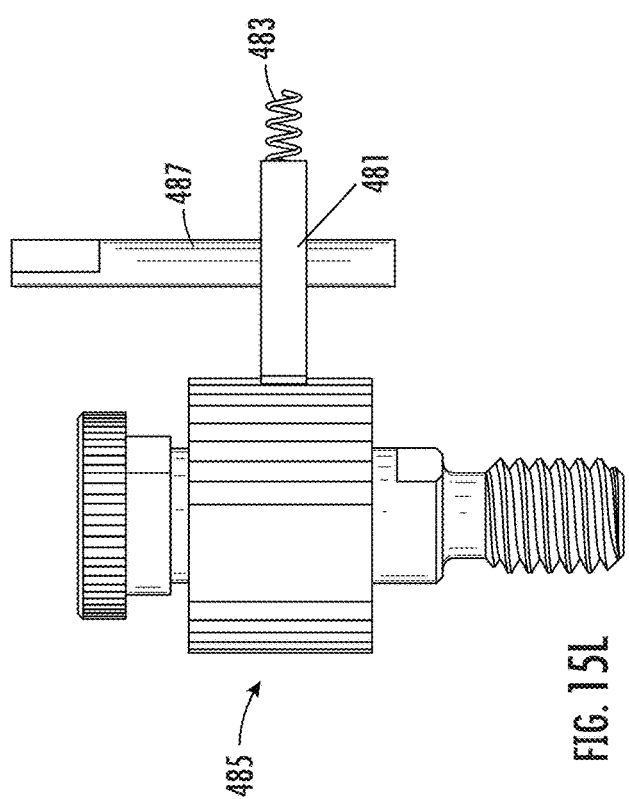
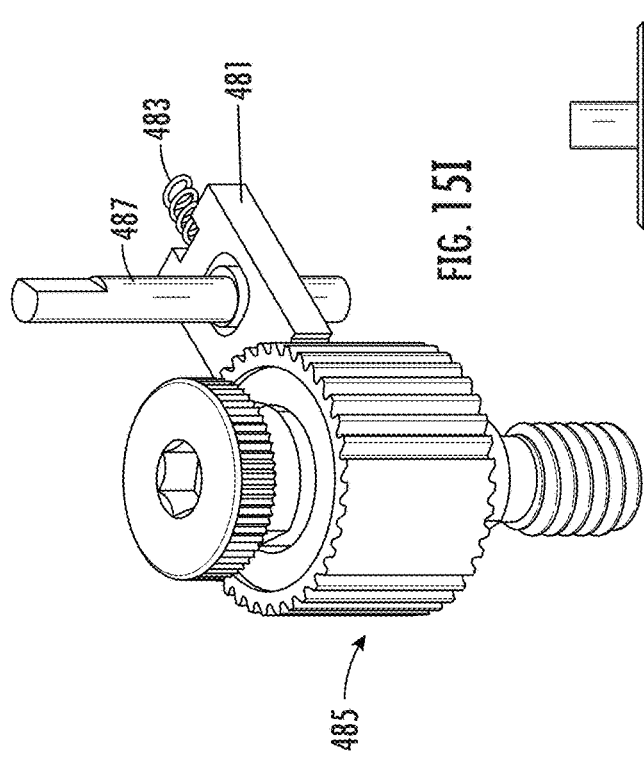
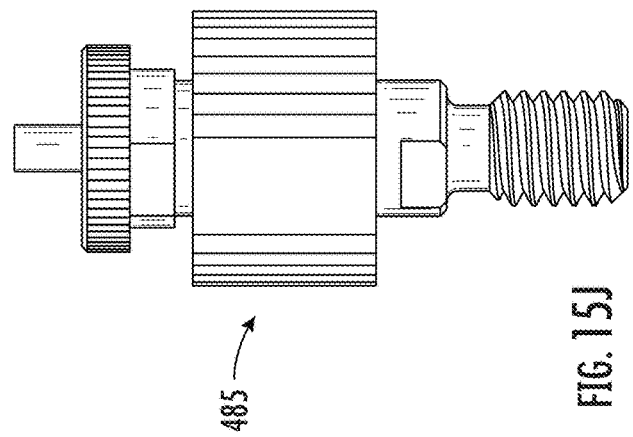

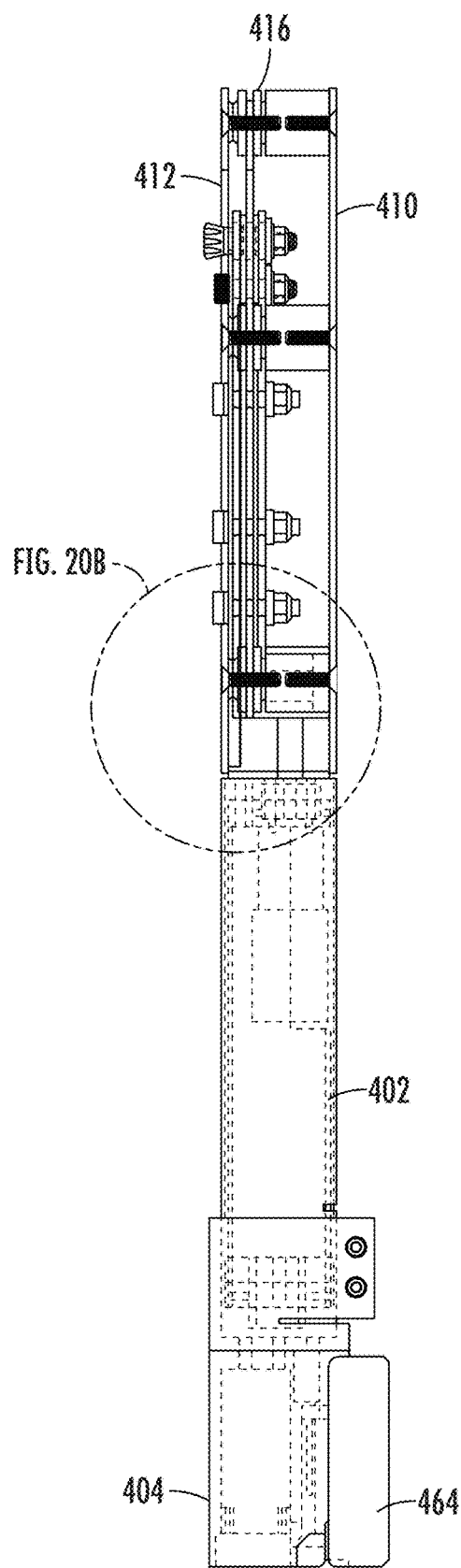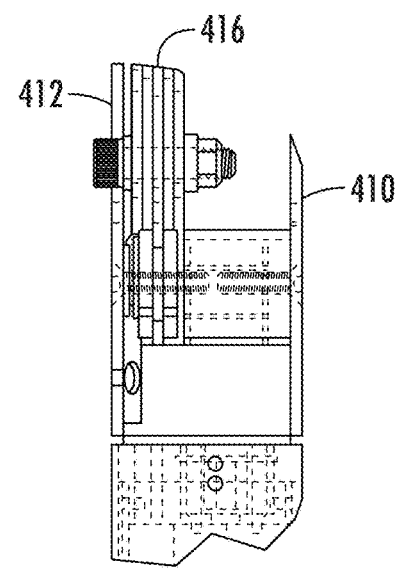
FIG. 20A
FIG. 20B

SYSTEM AND METHODS OF SMART WELDING OPERATIONS

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/980,672 entitled "SYSTEM AND METHODS OF SMART WELDING OPERATIONS", filed Feb. 24, 2020. The contents of the above referenced application are incorporated herein by reference in its entirety.

FIELD OF THE INVENTION

The present invention relates to systems and methods of welding operations; and more particularly, to use of technology integrated into systems and methods of welding operations.

BACKGROUND OF THE INVENTION

Current welding technology dates back to the early 1980's. Companies employing such operations have yet to embrace the various technological advances and use of smart technologies as adapted in other industries.

SUMMARY OF THE INVENTION

The present invention relates to welding systems and operations which integrate technology to increase performance and safety in welding operations. The smart system and process is designed to capture various information associated with the smart system and process to provide various data analytics.

Accordingly, it is an objective of the invention to provide a smart welding system.

It is a further objective of the invention to provide a smart welding operation.

It is yet another objective of the invention to provide smart welding systems and operations which utilize wireless technology.

It is a still further objective of the invention to provide a smart welding system that monitors and collects data from the one or more components or devices of the system.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 15C is an alternative view of the partial exploded view of the smart welding positioner;

FIG. 15D is an enlarged view of Section A in FIG. 15C;

FIG. 15E is an enlarged view of Section B in FIG. 15C;

FIG. 15I illustrates an embodiment of a sprag and pawl assembly;

FIG. 15J is an alternative view of the sprag and pawl assembly;

FIG. 15K is an alternative view of the sprag and pawl assembly;

FIG. 15J is an alternative view of the sprag and pawl assembly;

FIG. 20A is a right side view of the smart welding positioner;

FIG. 20B is an enlarged view of Section F in FIG. 20A;

DETAILED DESCRIPTION OF THE INVENTION

Figure 1:
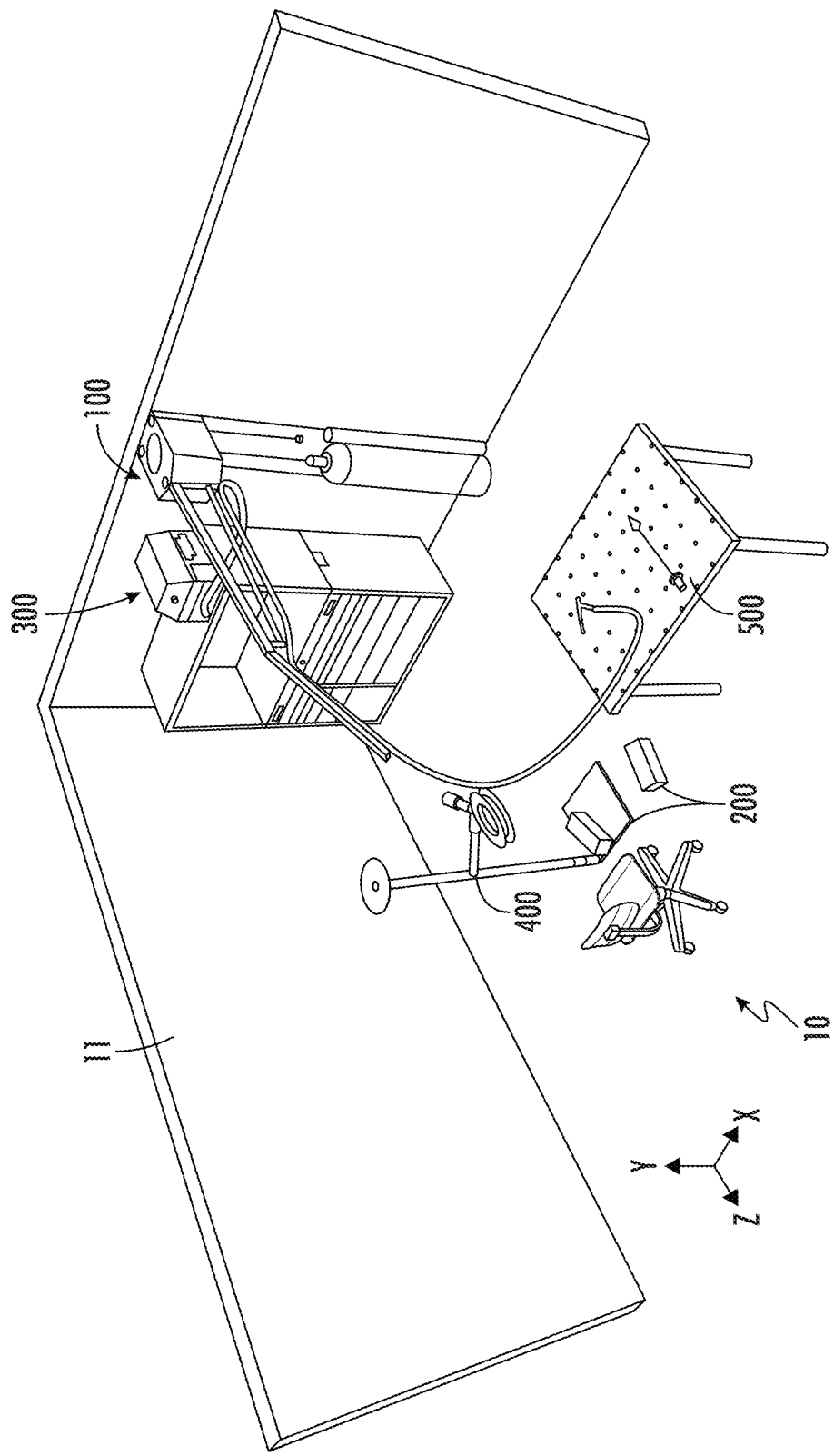
FIG. 1 illustrates the various components of a smart welding system.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, an illustrative embodiment of a smart welding manufacturing system, referred to generally as a smart welding system 10, is shown. The smart welding system 10 may include one component or device, two components or devices, multiple components or devices, and two or more components or devices in any combination. As shown in FIG. 1, the smart welding system 10 comprises one or more components or devices located in a room 11. The smart welding system 10 may include, as a single component, all components, or any combination of components therebetween, a TIG welding station 100, one or more smart foot pedals 200, a smart receiver system 300, a smart welding positioner 400, and a smart purge plug 500.

Figure 2:
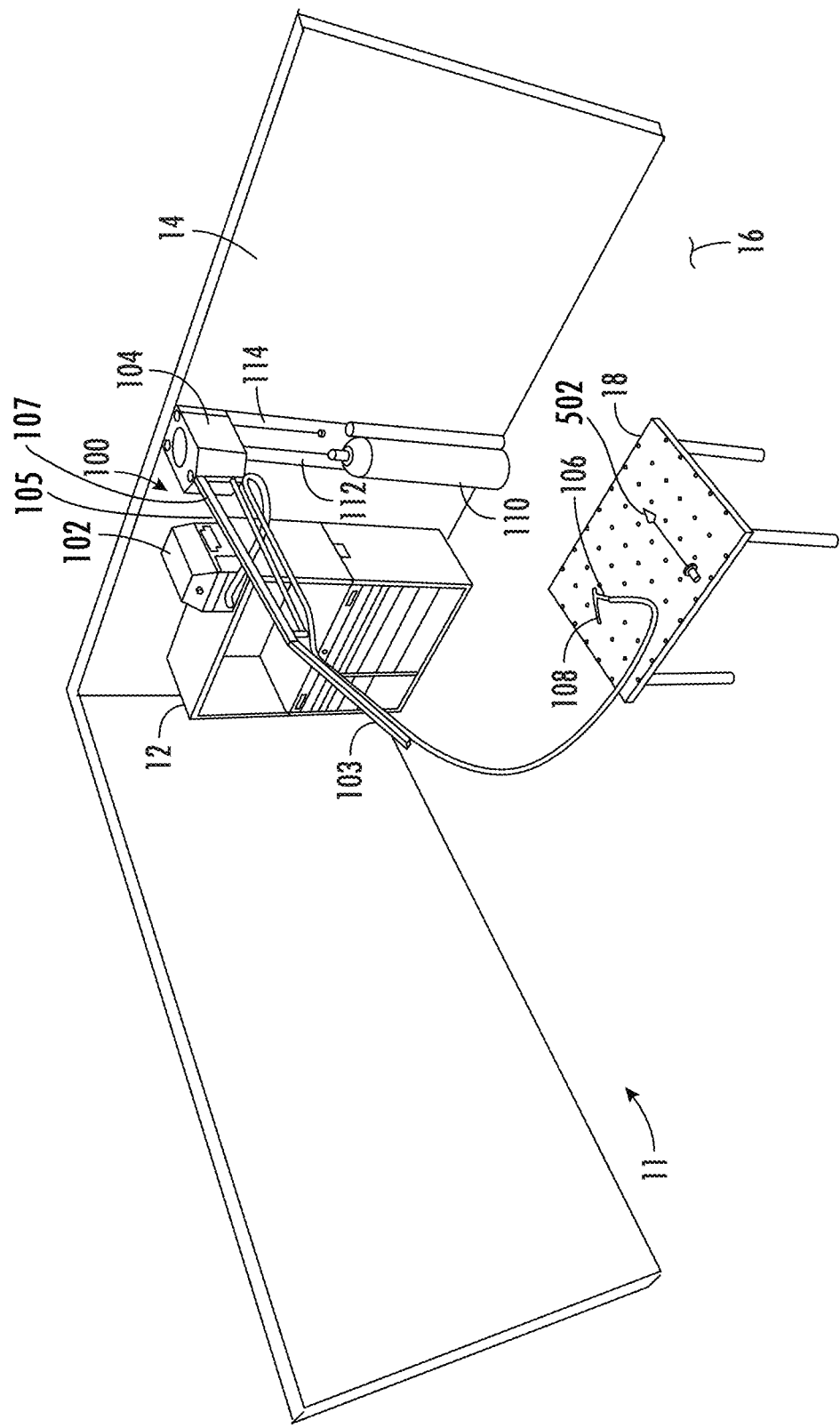
FIG. 2 illustrates a welding station which forms part of the smart welding system.
Figure 3A:
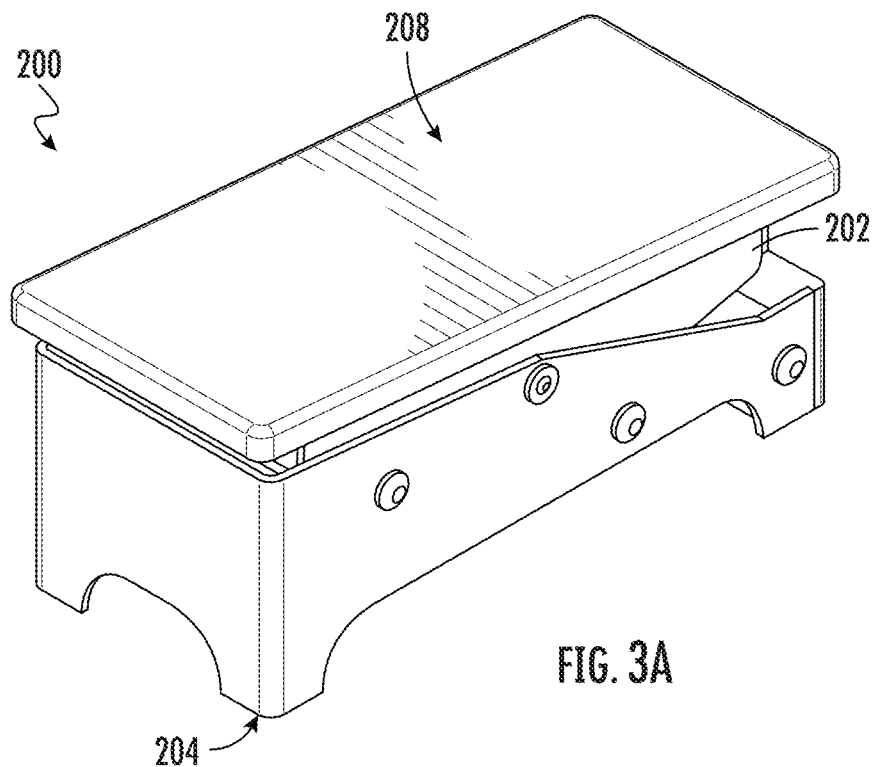
FIG. 3A is a perspective view of an illustrative embodiment of a foot pedal.
Figure 3B:
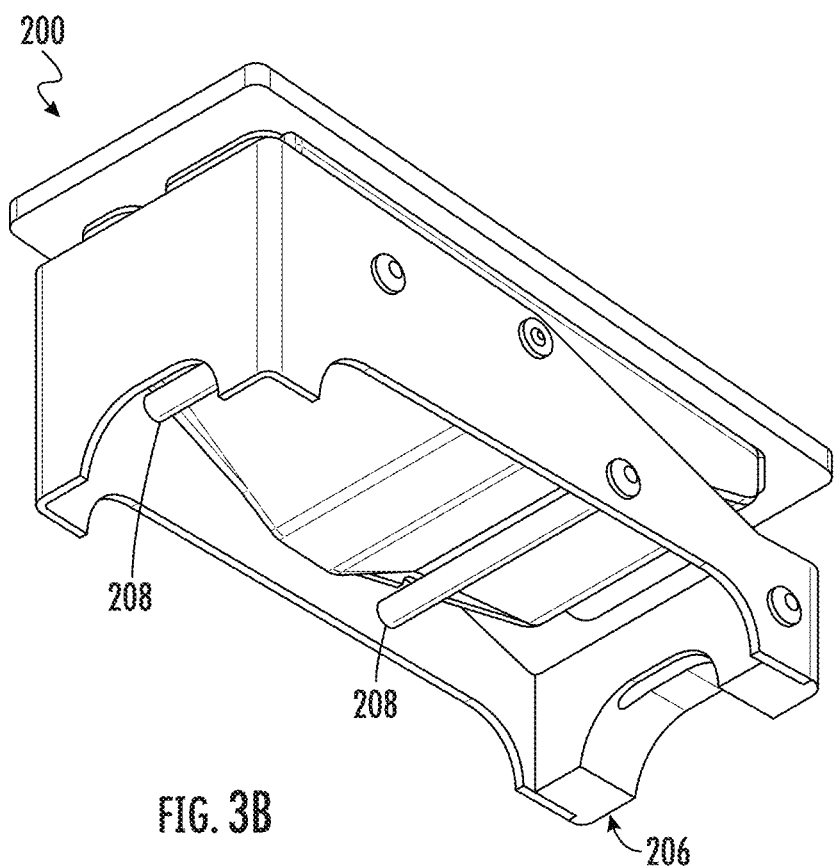
FIG. 3B is an alternative view of the foot pedal.
Figure 3C:
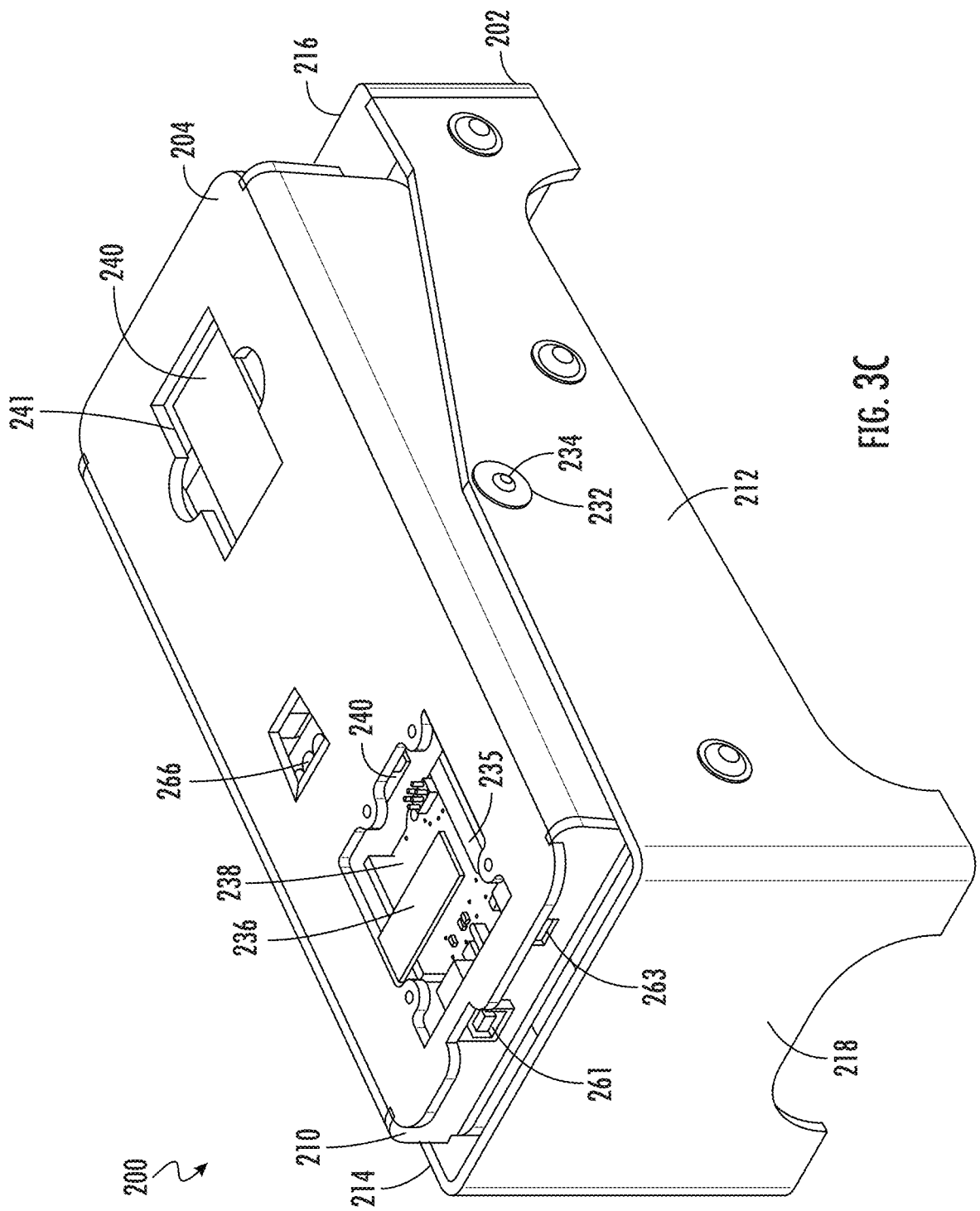
FIG. 3C is a perspective view of the foot pedal, with the foot pad removed.
Figure 3D:
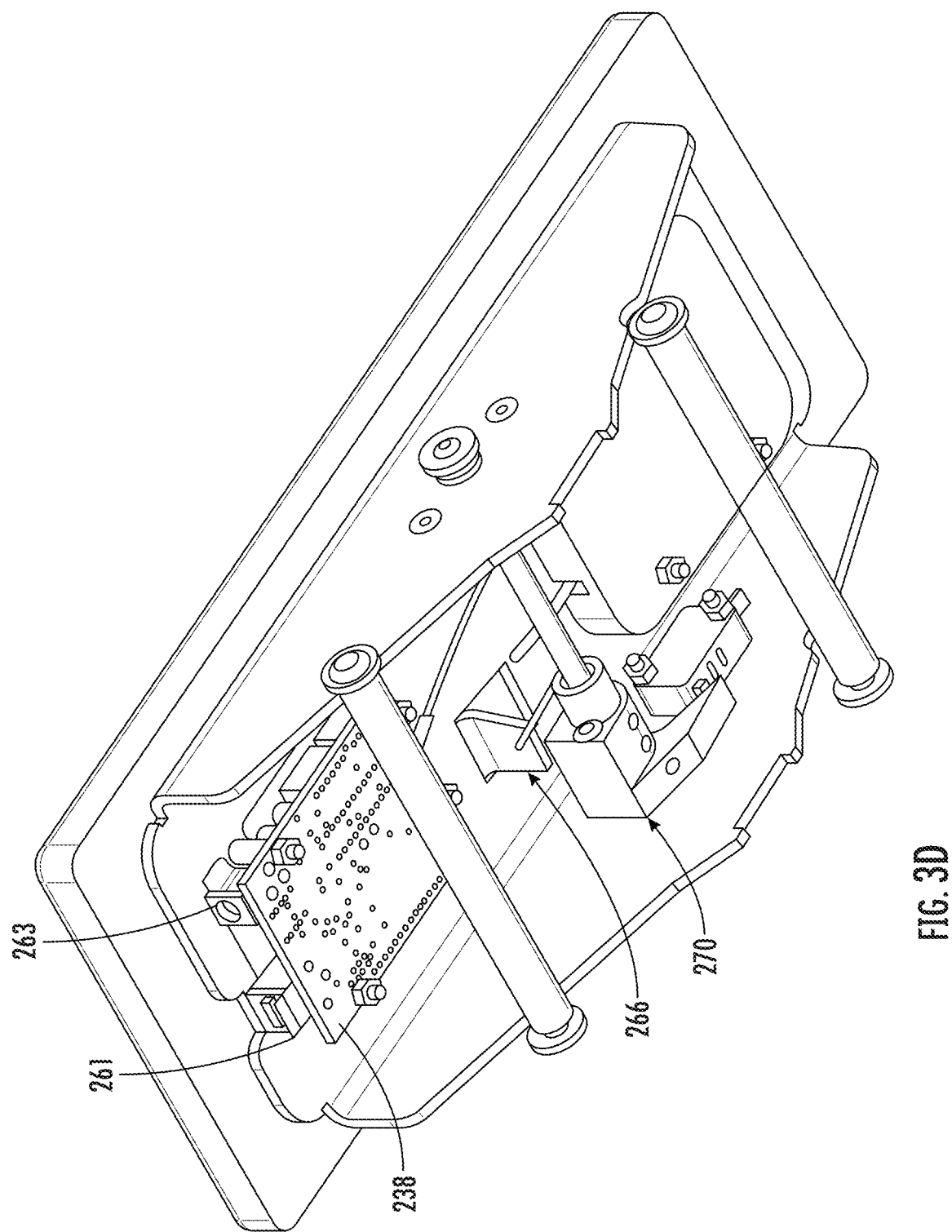
FIG. 3D is a partial view of foot pad, the illustrating several internal components.
Figure 3E:
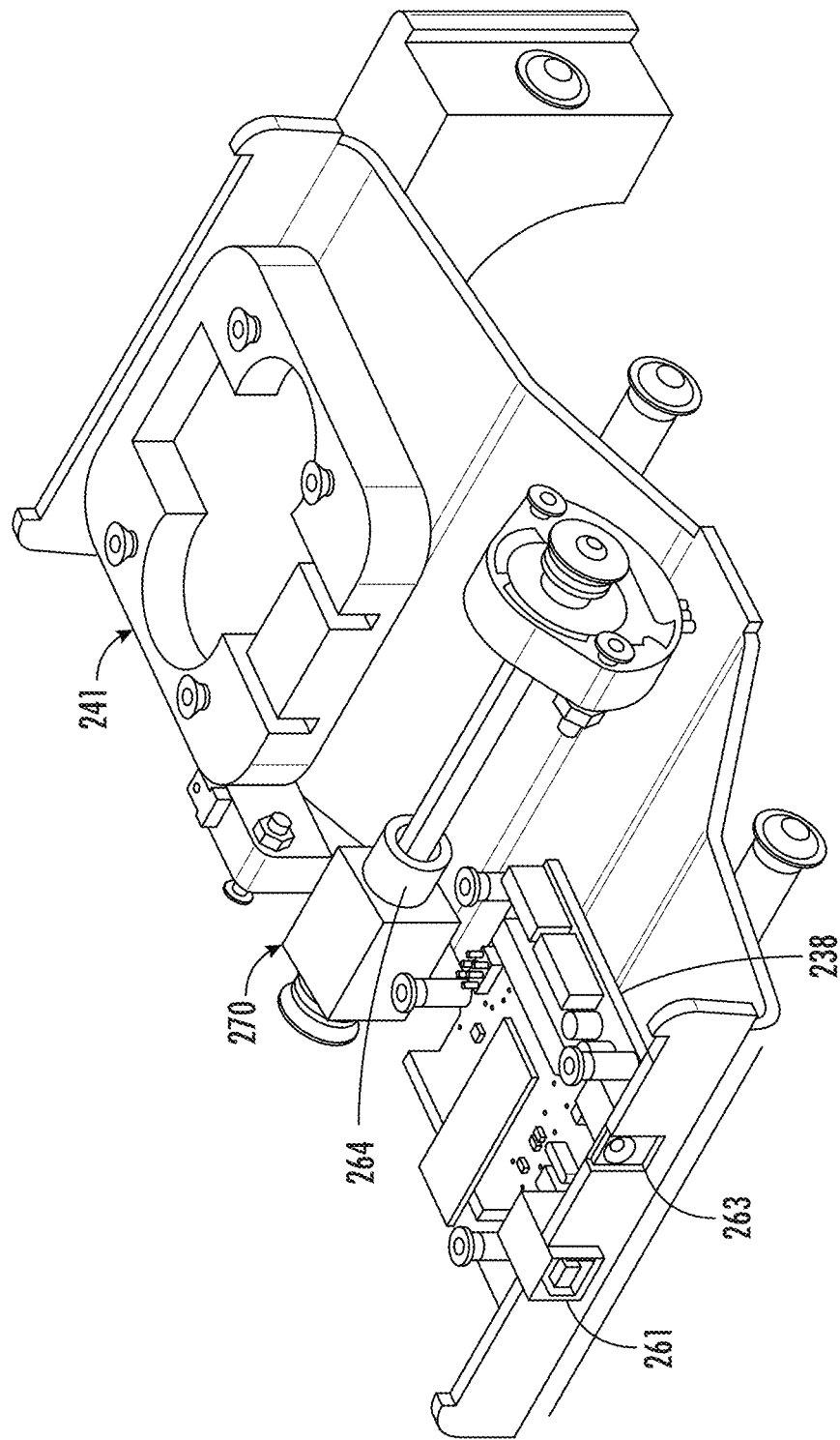
FIG. 3E is a partial view of foot pad, the illustrating several internal components.
Figure 4:
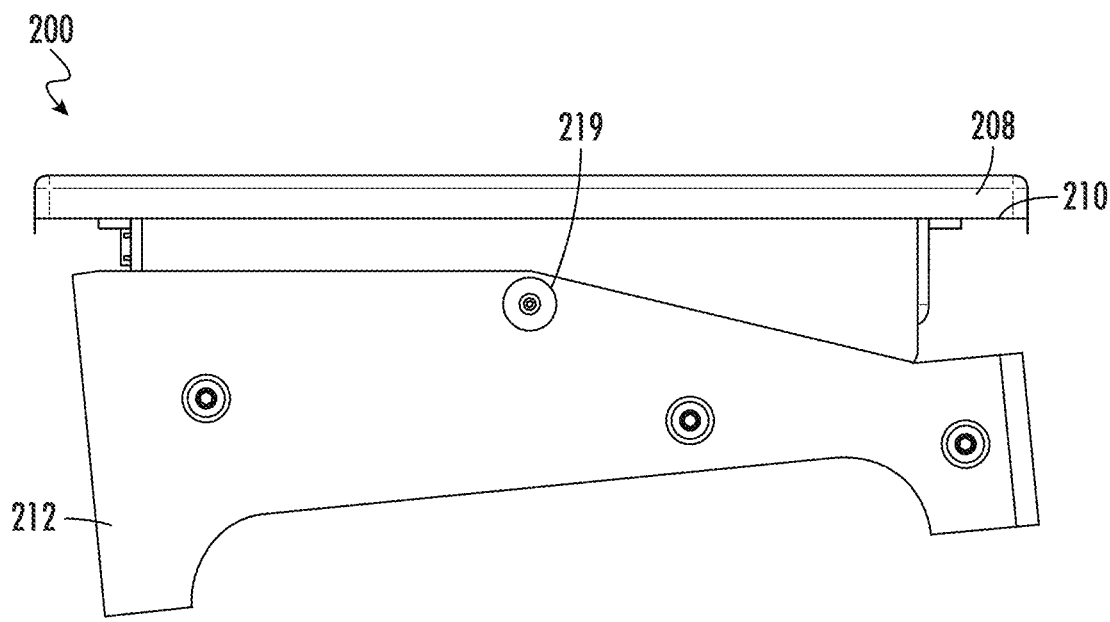
FIG. 4 is a side view of the foot pedal.
Figure 5:
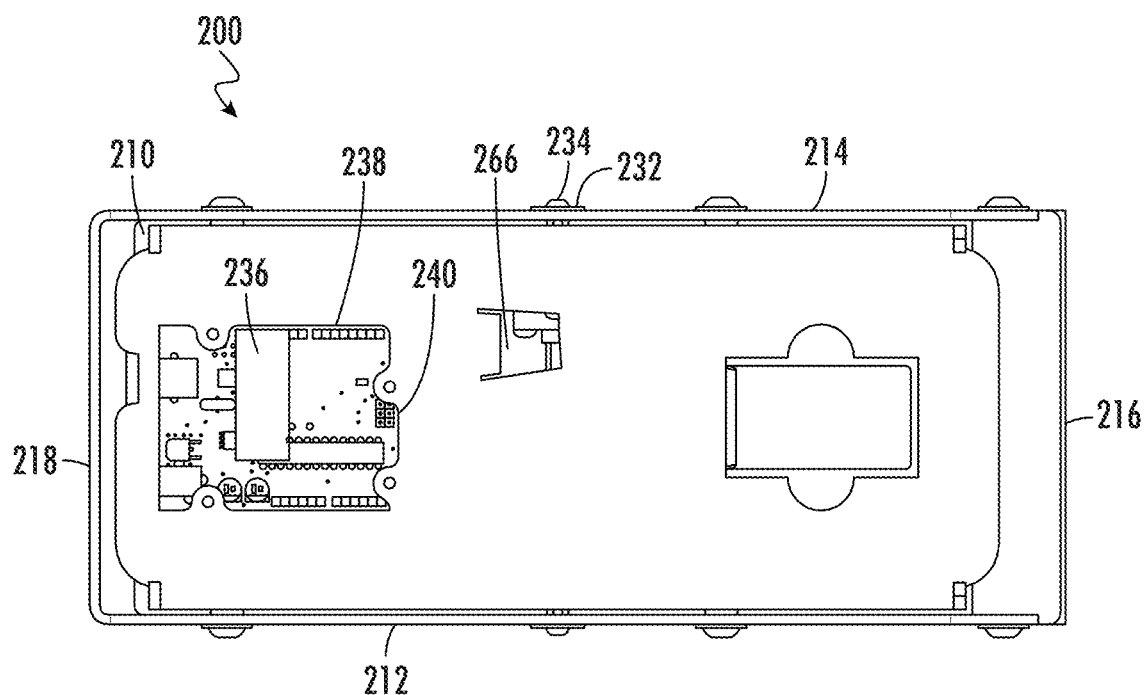
FIG. 5 is a top view of the foot pedal.

Referring to FIG. 2, an illustrative embodiment of the welding station 100 is shown in a room 11, parts of which are resting on or secured to a storage unit 12, a wall 14, a floor 16, or a table 18. The welding station 100 shown is designed for TIG welding and includes a TIG welding machine 102, an articulating arm 103 controlled by an arm control unit 105 having an elongated body 107 with a power source 104, an electrode holder 106 and electrode 108, such as a tungsten electrode, and a gas tank/cylinder 110. The welding station 100 may include integrated water cooling 112 and gas piping 114.

Referring to FIGS. 3A-7, an illustrative embodiment of the smart foot pedal 200 is shown. The smart foot pedal 200 may include a rotating pedal assembly 202, housing all electronics and a return spring mechanism, and a pedal base assembly 204, preferably having fixed parts, having a base heel joint for stability 206. The pedal base assembly 204 may include a pedal base stiffener and pedal limit stops 208, illustrated herein as a rod. The smart foot pedal 200 may include a footpad and electronic cover 206. The smart foot pedal 200 is preferably configured to function in a wireless capacity. It is configured to be programmable, and designed to electronically interact with and control the smart welding positioner 400 and/or interact with and control one or more components of the welding station 100. The smart foot pedal 200 may be made of stainless steel, but any material known to one of skill in the art may be used. The smart foot pedal 200 comprises a foot panel 210, which is preferably is covered by the foot pad 208, which the user may engage with by applying or removing a force. In typical use, the force may be generated by a user stepping on the foot pad 208, causing the foot pad 208 and foot panel 210 to move downward. Removing the force causes the foot pad 208 and foot panel 210 to return to their original position.

The smart foot pedal 200 may comprise a first side panel 212, a second side panel 214, a back panel 216, and a front panel 218. The smart foot pedal 200 may include a d-shaped hole 219 in the pedal base 204, thus creating a rigid connection to the d-shaft 220. The pedal assembly is designed to rotate round the fixed d-shaft 220. The smart foot pedal 200 is preferably configured for wireless communication and may include a wireless communication technology unit or assembly, including BLUETOOTH module 235, configured to exchange data with one or more other components of the smart welding system 10. The BLUETOOTH module 235 may include a radio frequency unit having a receiver/transmitter designed for sending and receiving voice or data signals. While BLUETOOTH technology utilizes short wavelength radio waves, other wireless communication mechanisms known to one of skill in the art may be used.

One or more functions may be controlled by a processor, illustrated herein as a microprocessor 236 on an integrated circuit or chip 238. The integrated circuit or chip 238 may include multiple digital input/output pins (some of which to be used as PWM digital and analog outputs), analog inputs, a 16 MHZ quartz crystal, a USB connection, a power jack, an ICSP header and a reset button. The integrated circuit or chip 238 is configured to connect to a computer with a USB cable, powered with an AC-to-DC adapter, or with a battery 240 (housed in a battery housing 241. The battery 240 may be, for example, a Lithium Polymer (LiPo) battery. The smart foot pedal 200 may include a USB data/charge port 261 and/or a DC charging port 263, for charging or powering purposes.

Figure 6:
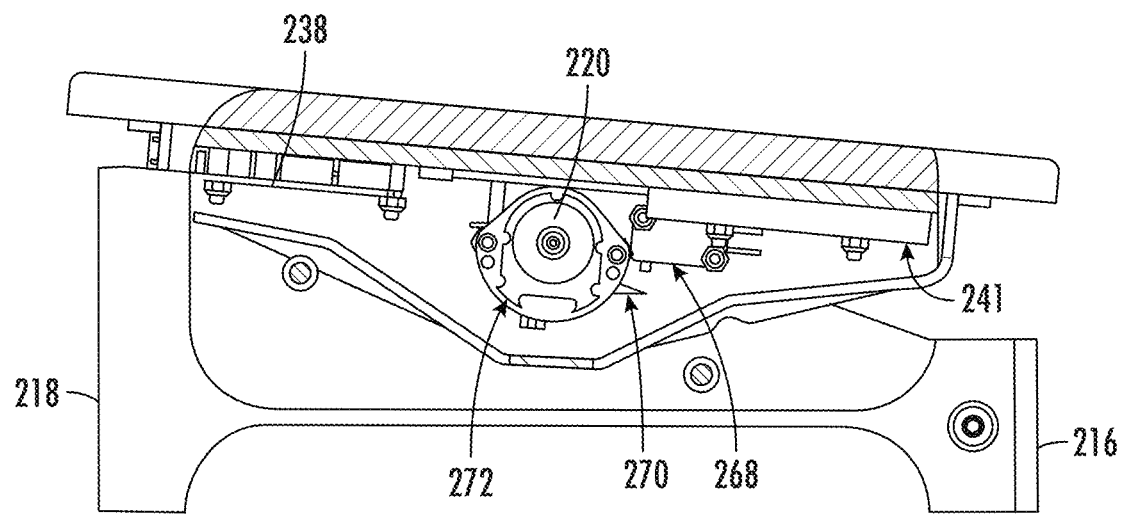
FIG. 6 is a left side view of the foot pedal, illustrating several internal components.
Figure 7:
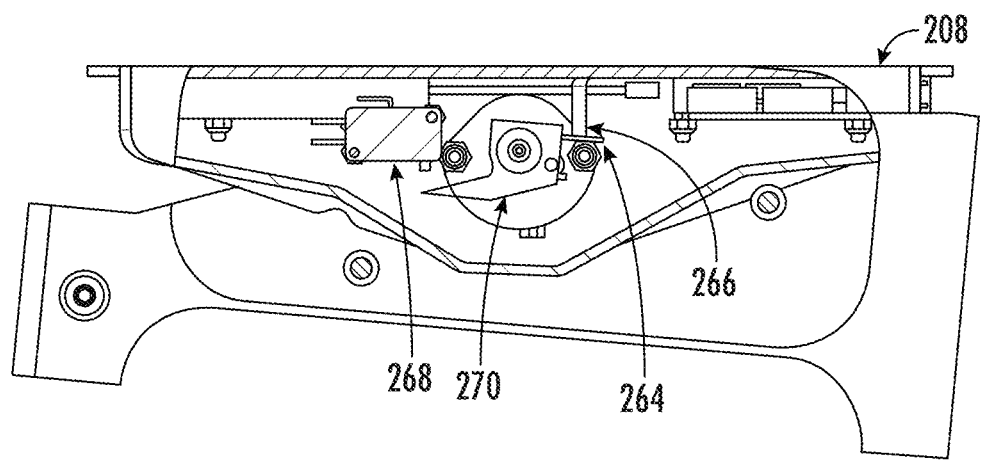
FIG. 7 is a right side view of the foot pedal, illustrating several internal components.
Figure 8:
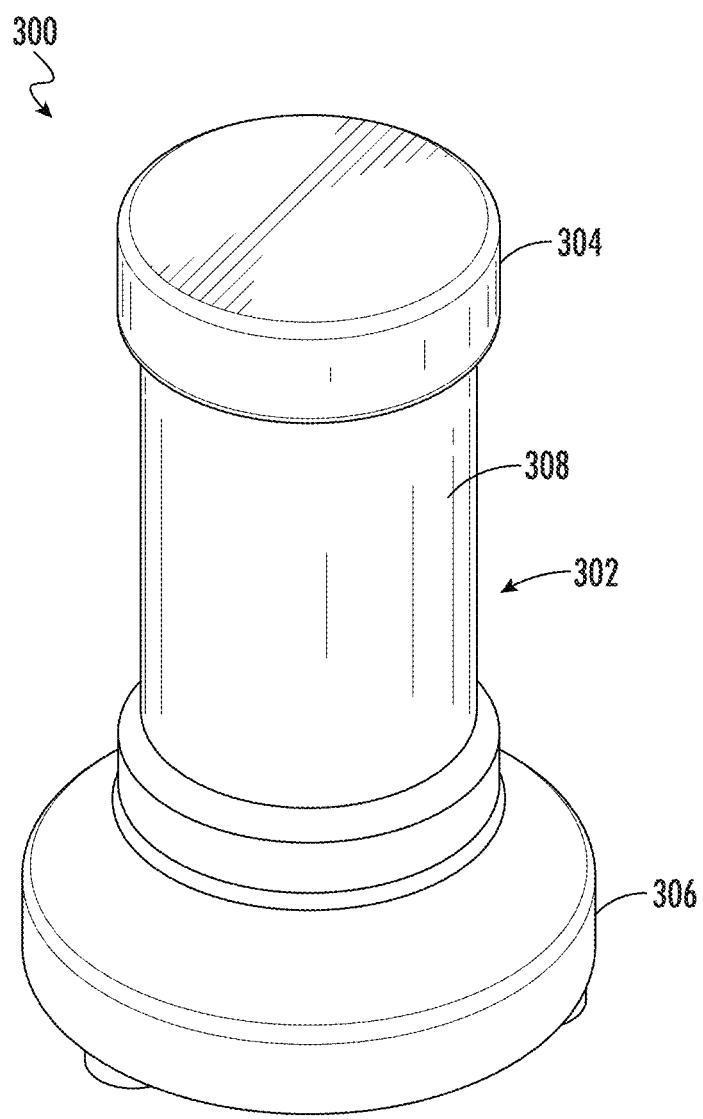
FIG. 8 is a perspective view of an illustrative embodiment of a smart receiver.
Figure 9:
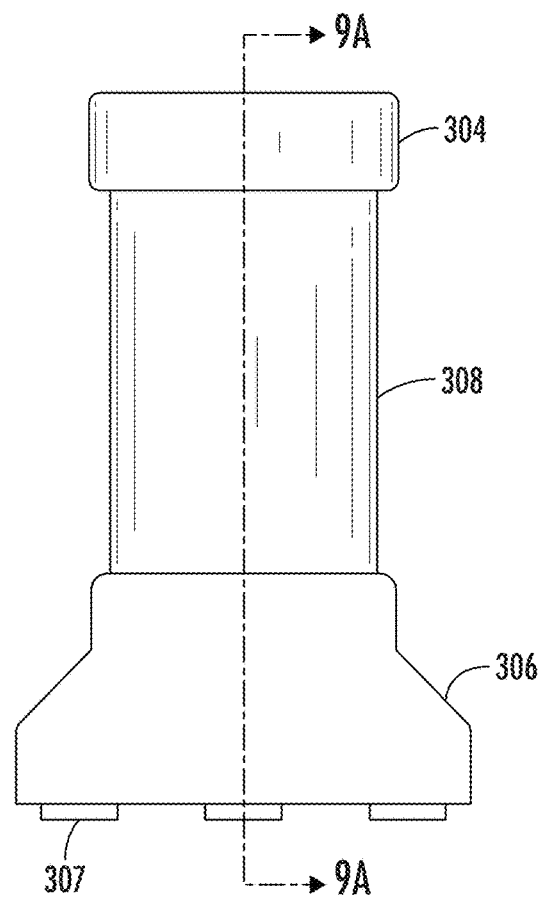
FIG. 9 is a front view of the smart receiver.
Figure 10:
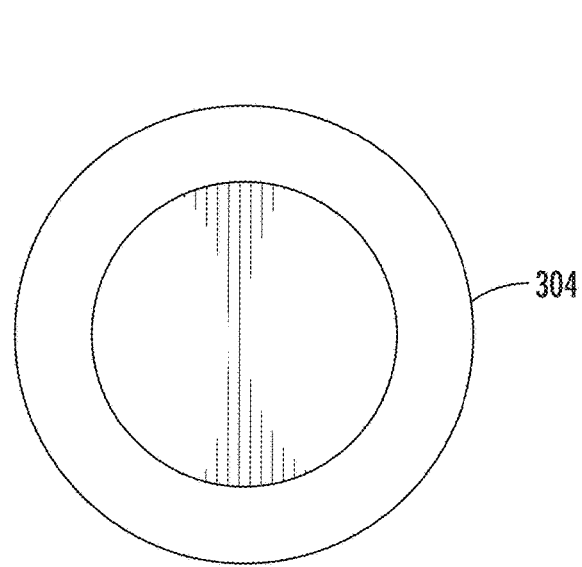
FIG. 10 is a top view of the smart receiver.
Figure 11:
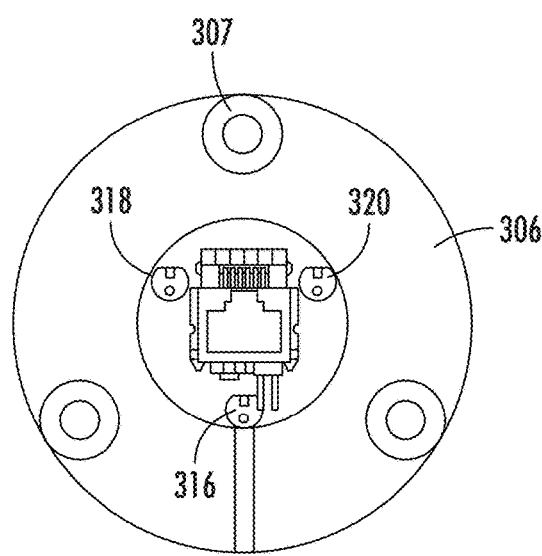
FIG. 11 is a bottom view of the smart receiver.
Figure 12:
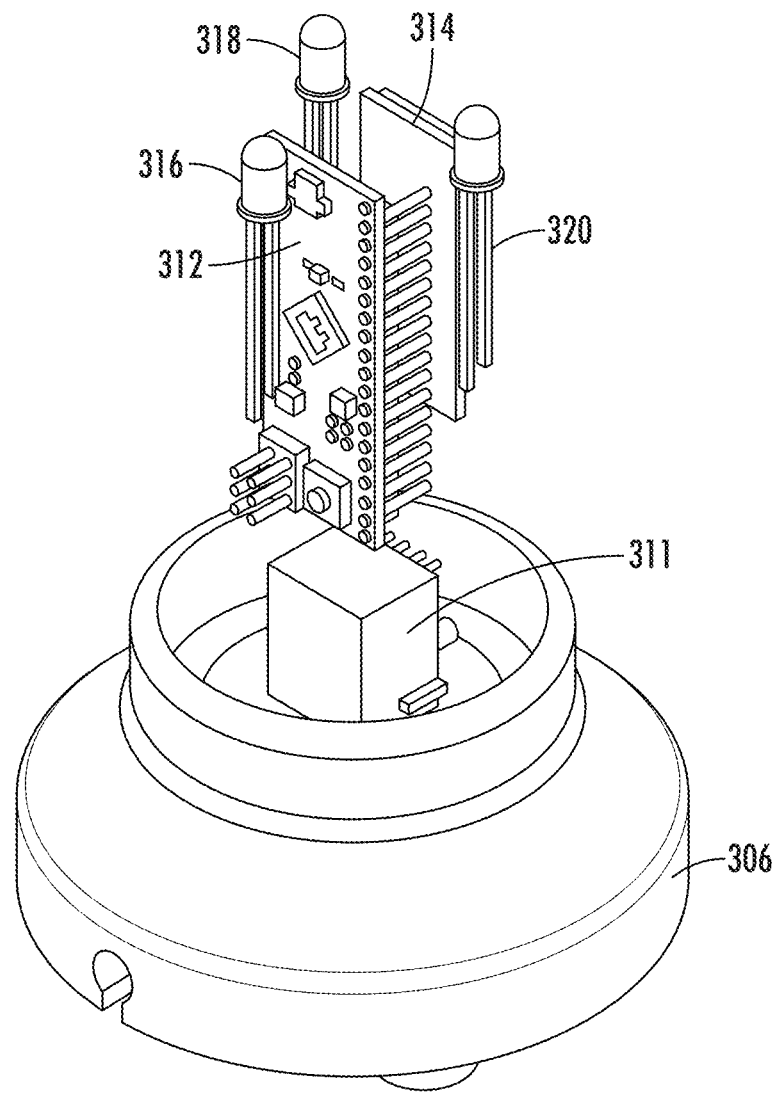
FIG. 12 illustrates the smart receiver, shown with the external case removed, illustrating the internal components.
Figure 13:
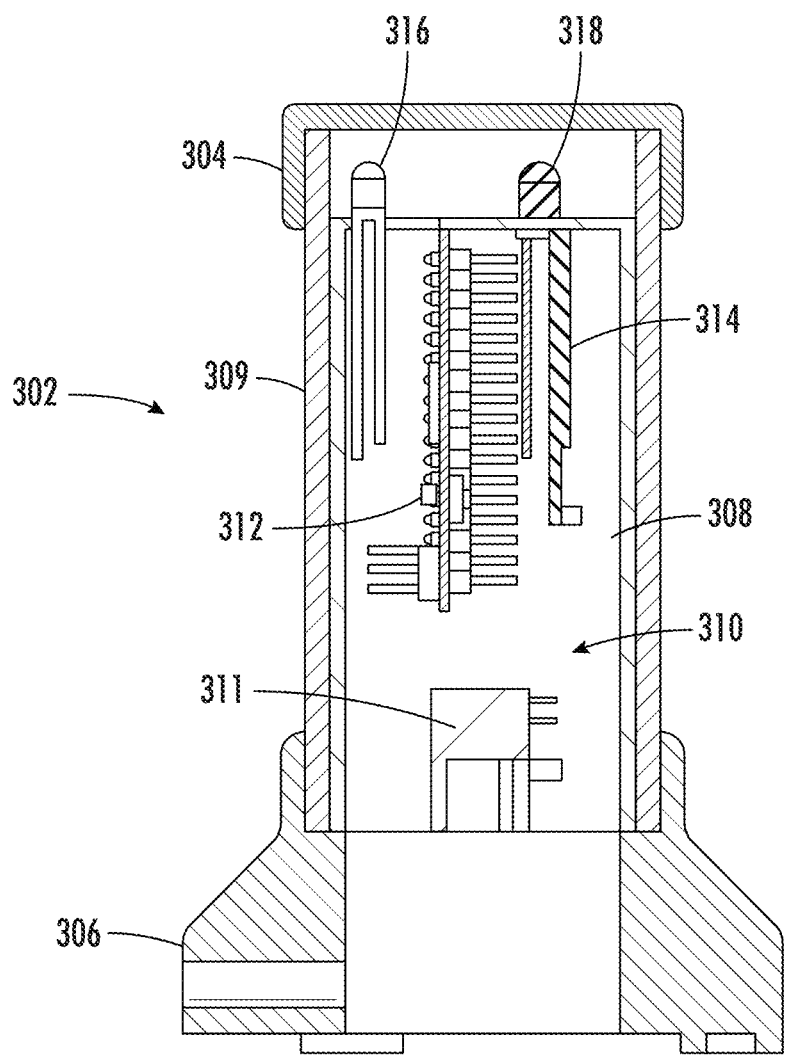
FIG. 13 is a cross sectional view of the smart receiver taken along line 9A-9A in FIG. 9.
Figure 14A:
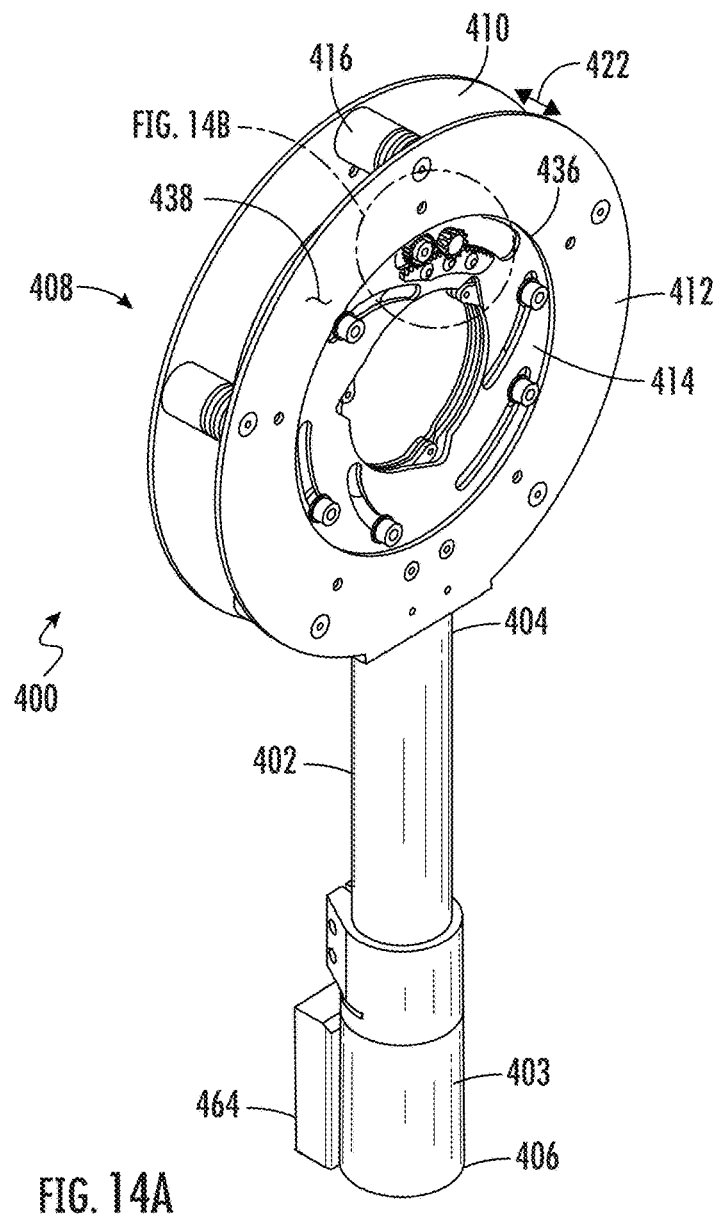
FIG. 14A is a perspective view of the smart welding positioner.
Figure 14B:
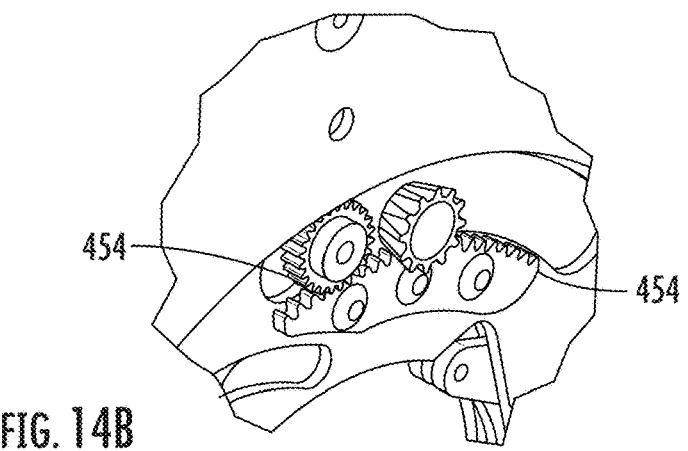
FIG. 14B is an enlarged view of Section C in FIG. 14A.
Figure 14C:
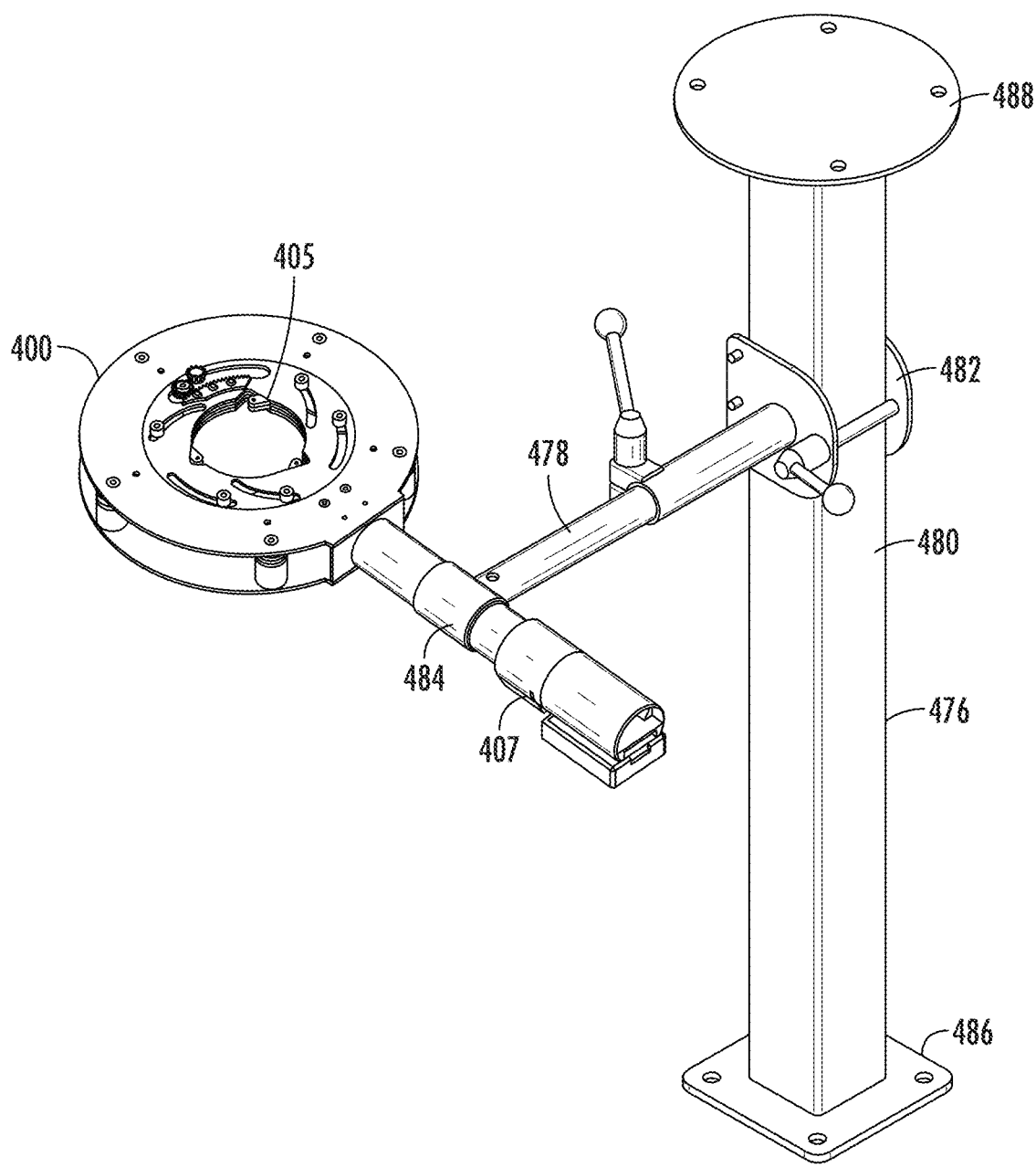
FIG. 14C is an illustration of the smart welding positioner attached to a support structure.

The smart foot pedal 200 may also be configured to include a return spring 264, a spring catch 266, a limit switch 268, and a spring mount and limit switch cam 270, see FIGS. 6 and 7. The spring mount and limit switch cam 270 may be rigid or flexible. The smart foot pedal 200 may also include a through hole potentiometer, 272

Referring to FIGS. 8-13, an illustrative example of a smart receiver system 300 is shown. The smart receiver system 300 may be configured to have WiFi capability and WiFi data acquisition, include a digital potentiometer (programmable data output), pulse arc TIG welding control, and smart phone user interface. The smart receiver system 300 is configured to control the welding machine 102 current via the smart foot pedal 200. In addition, the smart receiver system 300 may be configured to receive status signals, from for example, gas and proximity sensors, that will be identifiable as the unit illuminates specific colors. The smart receiver system 300 may comprise of a receiver housing unit 302 comprising a top unit 304, a bottom unit 306, with feet 307, and a main body 308, which may include an acrylic cover 309. The receiver housing unit 302 may include an interior 310 which stores or holds one or more functional components. The receiver housing unit 302 may include a processing unit, such as a micro processing board 312. The micro processing board 312 may include one or more of the digital input/output pins (some of which may be used as PWM outputs and as analog inputs), a 16 MHz crystal oscillator, a micro USB connection, an ICSP header, and a reset button, the aforementioned components are not shown. The micro processing board 312 may be designed to connect to a computer with a micro USB cable to get started, and may have built-in USB communication, eliminating the need for a secondary processor. The receiver housing unit interior 310 may also include a network cable jack 311.

The smart receiver system 300 is preferably configured for communication via wireless technology. Wired technology, as known to one of skill in the art, may be employed as well. In an illustrative example, the smart receiver system 300 may be designed to communicate, either recover or transmit signals, via BLUETOOTH technology. Accordingly, the receiver housing unit 302 may include a BLUETOOTH module 314, configured to exchange data with one or more other components of the smart welding system 10. The BLUETOOTH module 314 may include (not shown) a radio frequency unit having a receiver/transmitter designed for sending and receiving voice or data signals. While BLUETOOH technology utilizes short wavelength radio waves, other wireless communication mechanisms known to one of skill in the art may be used.

The receiver housing unit 302 may include one or more light indicators, illustrated herein as LED bulbs 316, 318 and 320. LEDs 316, 318 and 320 may be all one single color, such as white, blue, red, or green. Alternatively, each LED 316, 318 and 320 may be different colors, such as LED 316 being white; LED 318 being red; LED 320 being blue. LEDs 316, 318 and 320 may be programmable to be different colors at different times, or based on different signals received. Finally, LEDs 316, 318 and 320 may be configured to display light at a constant output, or may be configured to display light as one or more blinks, flashes, or flickers.

Referring to FIGS. 14A-20B, an illustrative embodiment of the smart welding positioner 400 is illustrated.

The smart welding positioner 400 is configured to be controllable via the smart foot pedal 200. For example, dynamic speed control, i.e. the ability to start the rotation at a lower speed and end at a higher speed, may be used (set start, middle, and end speed). As an illustrative example, as the part temperature increases less dwell time is required, and weld deposits can be added at a higher rate hence increasing the speed. The smart welding positioner 400 may also be configured to be programmable via a computer or smart device application. The smart welding positioner 400 is configured to provide a user the capability of fixturing and rotating bent, or non-bent, sections of tubing.

The smart welding positioner 400 comprises a main body chassis 402 having a first end 404 and a second, opposing end 406. The main body chassis 402 may include an electronics housing 403, including a microprocessor, wireless receiver and transmitter, and pulse width modulation speed controller. The electronics housing 403 secured to the main body chassis 402 via electronics to chassis mount 407. The main body chassis 402 may include a rotating chuck assembly 405. Secured, or integrally formed, to the first end 404 is a through-hole rotary welding positioner head assembly 408. The through-hole rotary welding positioner head assembly 408 comprises a first outer disc 410, a second outer disc 412, and an inner disc 414. The smart welding positioner 400 inner disc 414 is preferably rotatable attached to the second outer disc 412 via fastening member, illustrated herein as shoulder screws 415. The smart welding positioner 400 may include a copper ground block 413. The first outer disc 410 and the second outer disc 412 are separated by a plurality of cylindrical bodies 416, acting as or chuck roller guides, a having bearings 418 and washers 420, thus forming an inner space 422. The inner disc 414, chick upper cam disc, is located in between the first outer disc 410 and the second outer disc 412, positioned within the inner space 422. The smart welding positioner 400 may also include a copper sheet metal ground circuit 423. The smart welding positioner 400 may also include a drive roller 425.

The first outer disc 410 comprises an opening 424 surrounded by a surface 426 extending around the perimeter of the opening 424. An inner perimeter 427 of the first outer disc opening 424 may comprise threading 428 and a plurality of outwardly directed, i.e. directed away from the center of the opening 424, cutouts 430. A least one cut out section 430 comprises an appendage 432. The first outer disc surface 426 comprises a plurality of curved channels 434 with openings extending through the surface 426. The second outer disc 412 comprises an opening 436 having a surface 438 extending around the perimeter of the opening 436.

The inner disc 414 comprises an opening 440 surrounded by a surface 442 extending around the perimeter of the opening 440. An inner perimeter 444 of the inner disc opening 440 may comprise a plurality of outwardly directed, i.e. directed away from the center of the opening 440, cutouts 446. The inner disc surface 442 may comprise a plurality of curved channels 448 with openings extending through the surface 442 sized and shaped to receive a shoulder screws 415. The curved channels 448 provide a mechanism to allow rotation of the inner disc 414 despite being secured to the second outer disc 412 through the shoulder screws 415. As such, as the inner disc maybe rotated in a clockwise or counter clockwise direction, the curved channels 448 allow the inner disc to move relative to the fixed in place shoulder screws 415.

The smart welding positioner 400 is configured so that as the inner disc 414 is rotated in one direction, pipe engaging members 441 move inwardly, i.e. toward the center 440, thus contacting and securing or clamping to the device (i.e. a pipe) inserted inside the opening 440. As the inner disc 414 is rotated in an opposite direction, the pipe engaging members 441 are moved outwardly, or retract back to the original open position (away from the center 440). Preferably, the pipe engaging members 441 are fixed to a pivot point 443 which allows the pipe engaging members 441 to move inwardly (engaging positon)/outwardly (non-engaging position) as the inner disc 414 is rotated.

The inner disc 414 is rotated directionally via a gear assembly 450. The gear assembly 450 is secured to the first outer disc 410 via shoulder screws 452 and sprag set 453 (sprag gear). Gear 425 (cam disc gear drive) is configured to interact with a bracket 453 having teeth 455. The gear assembly 450 may include a ratchet housing 458 with a pawl cam 460 and knob 462. The gear assembly 450 may be activated manually or mechanically through use of a motor, such as a servo motor.

An interior 463 of the welding positioner main body chassis 402 may include a battery pack 464 with battery connector 466. The battery may be a rechargeable battery. A motor housing 468 includes a drive motor 470. The motor housing 468 may be configured to be offset from the axis of the inner motor housing 469. The interior 463 of the welding positioner main body chassis 402 may also include a fan 472 mounted to a fan mount 474. The through-hole rotary welding positioner head assembly 408 may be secured to the smart welding positioner main body chassis 402 via bracket. The smart welding positioner 400 may be secured to a support structure 476 through an adjustable arm 478, see FIG. 14C. The adjustable arm 478 may be secured to the support structure main body 480 via a bracket 482 at one end and to the smart welding positioner 400 via a collar 484 at a second end. The support structure main body 480 may include a lower base support plate 486 and an upper base support plate 488.

Figure 15A:
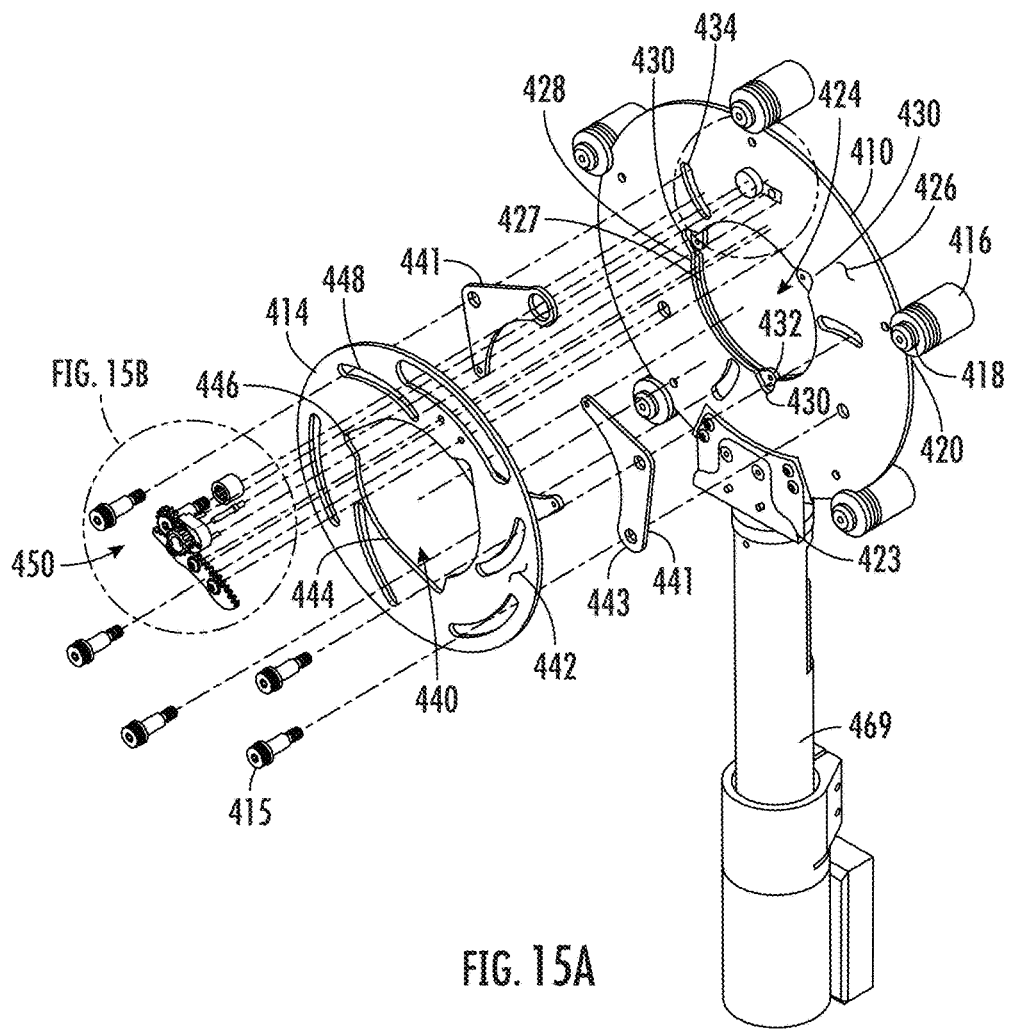
FIG. 15A is a partial exploded view of the smart welding positioner.
Figure 15B:
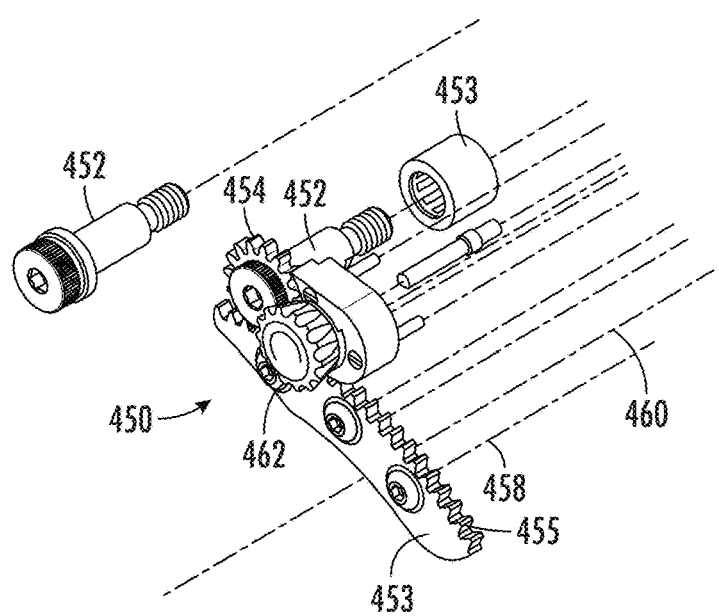
FIG. 15B is an enlarged view of Section H in FIG. 15A.
Figure 15F:
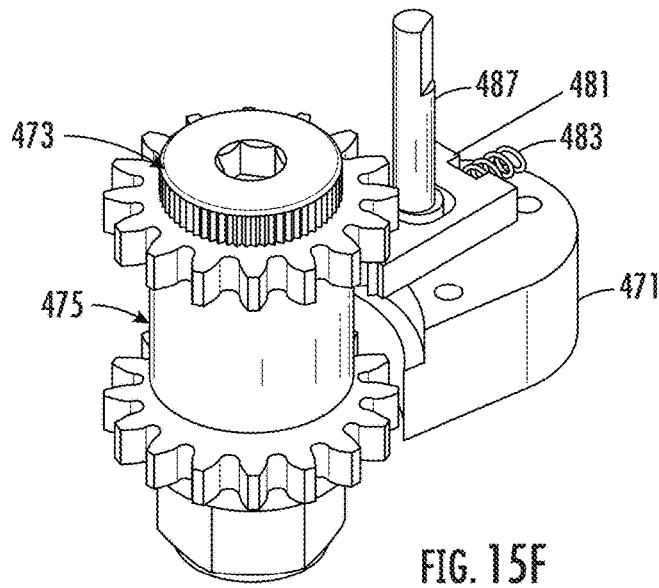
FIG. 15F illustrates an embodiment of a pawl retainer (upper or lower)
Figure 15G:
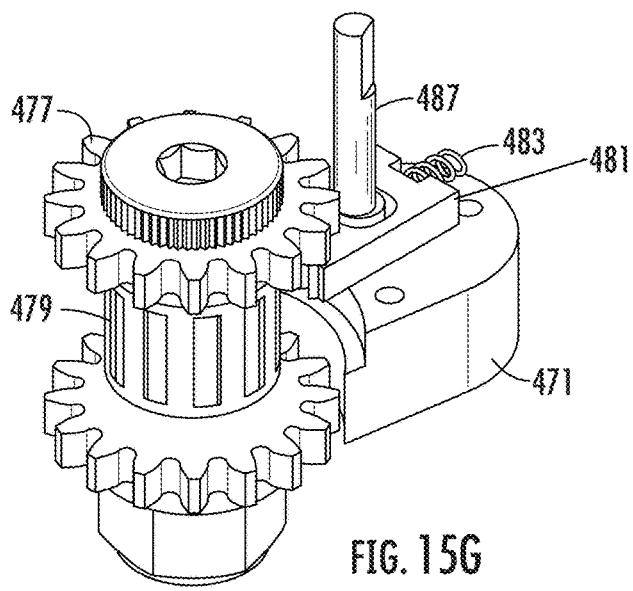
FIG. 15G is an alternative view of the pawl retainer (upper or lower)
Figure 15H:
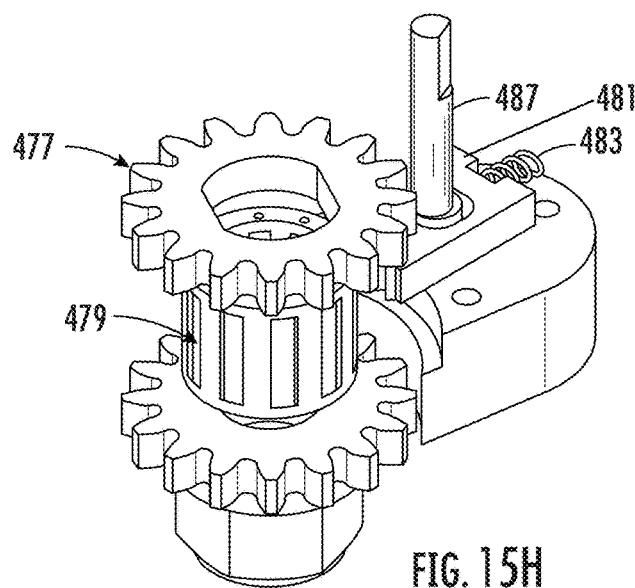
FIG. 15H is an alternative view of the pawl retainer (upper or lower)
Figure 16:
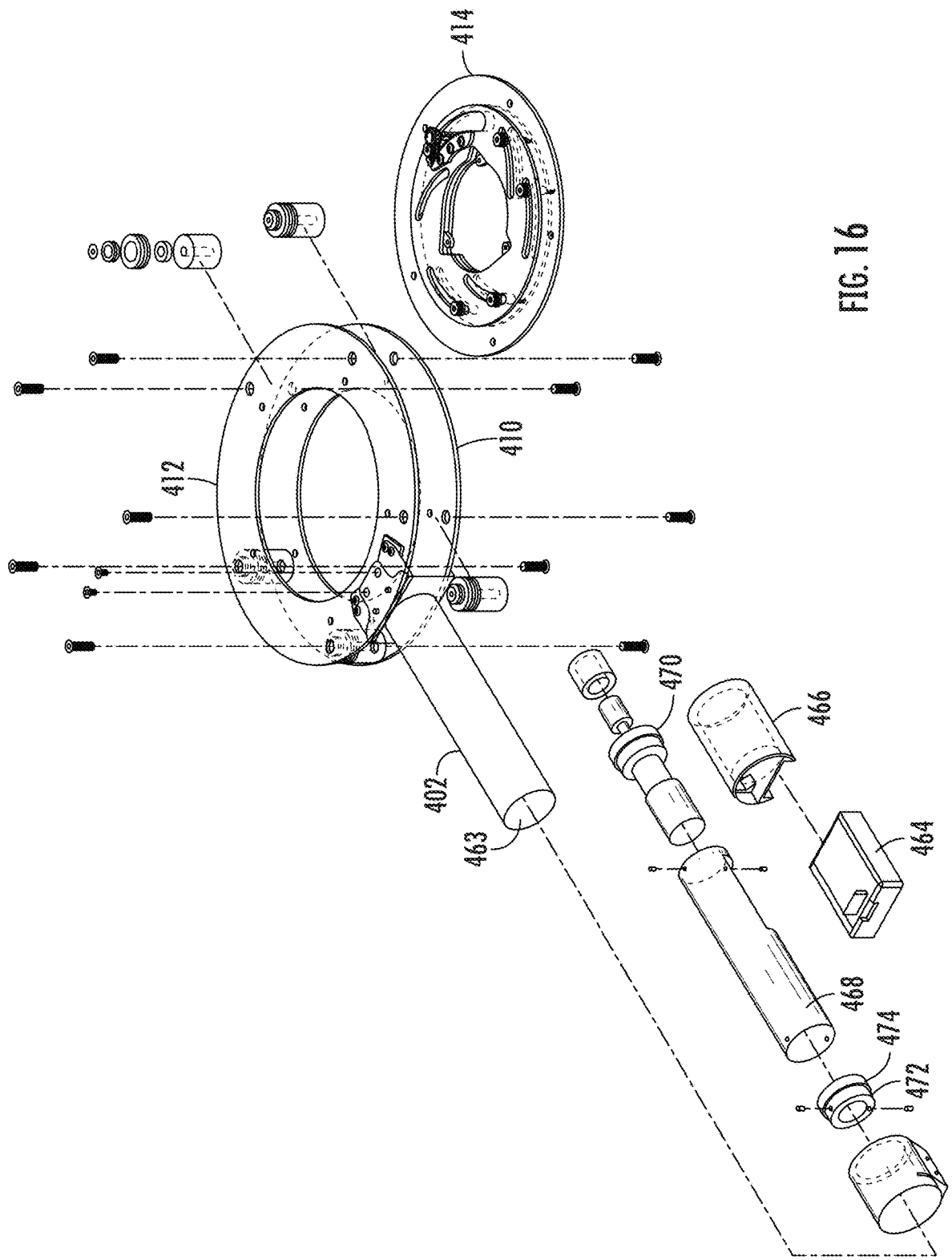
FIG. 16 is a phantom view of the smart welding positioner.
Figure 17A:
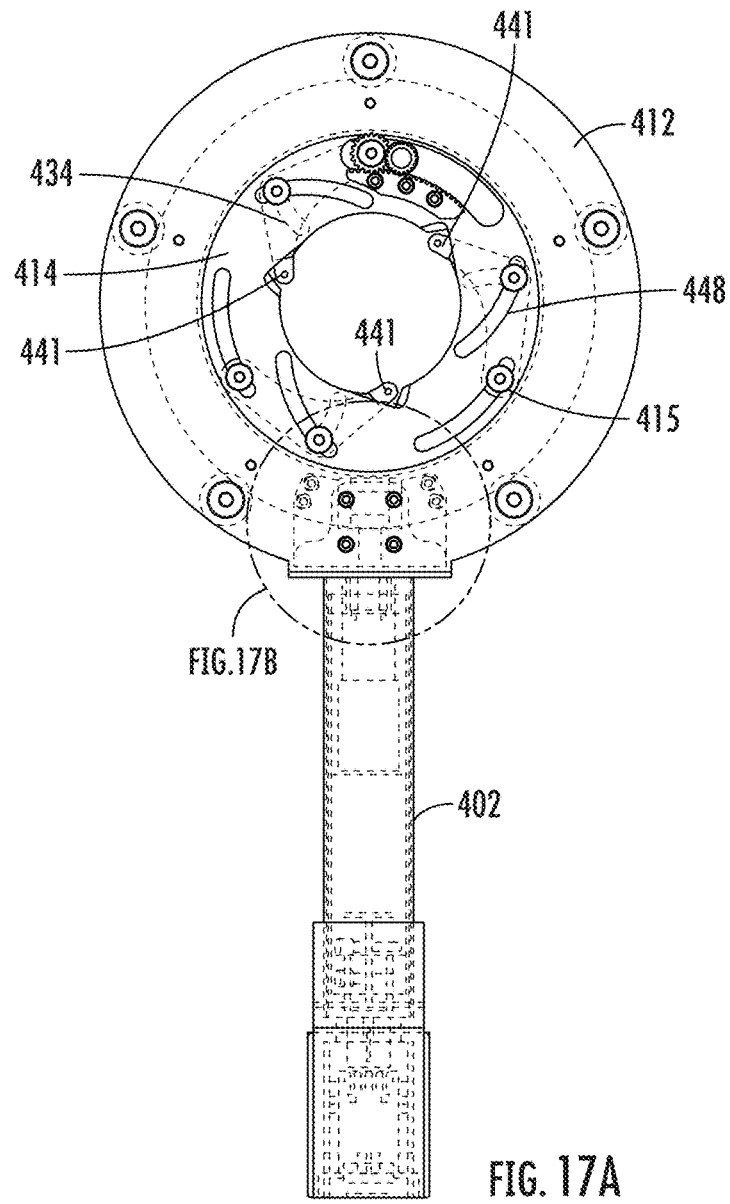
FIG. 17A is a front view of the smart welding positioner.
Figure 17B:
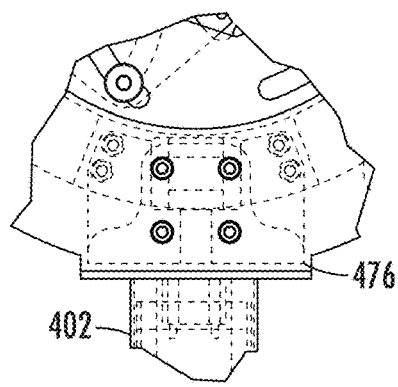
FIG. 17B is an enlarged view of Section E in FIG. 17A.
Figure 18:
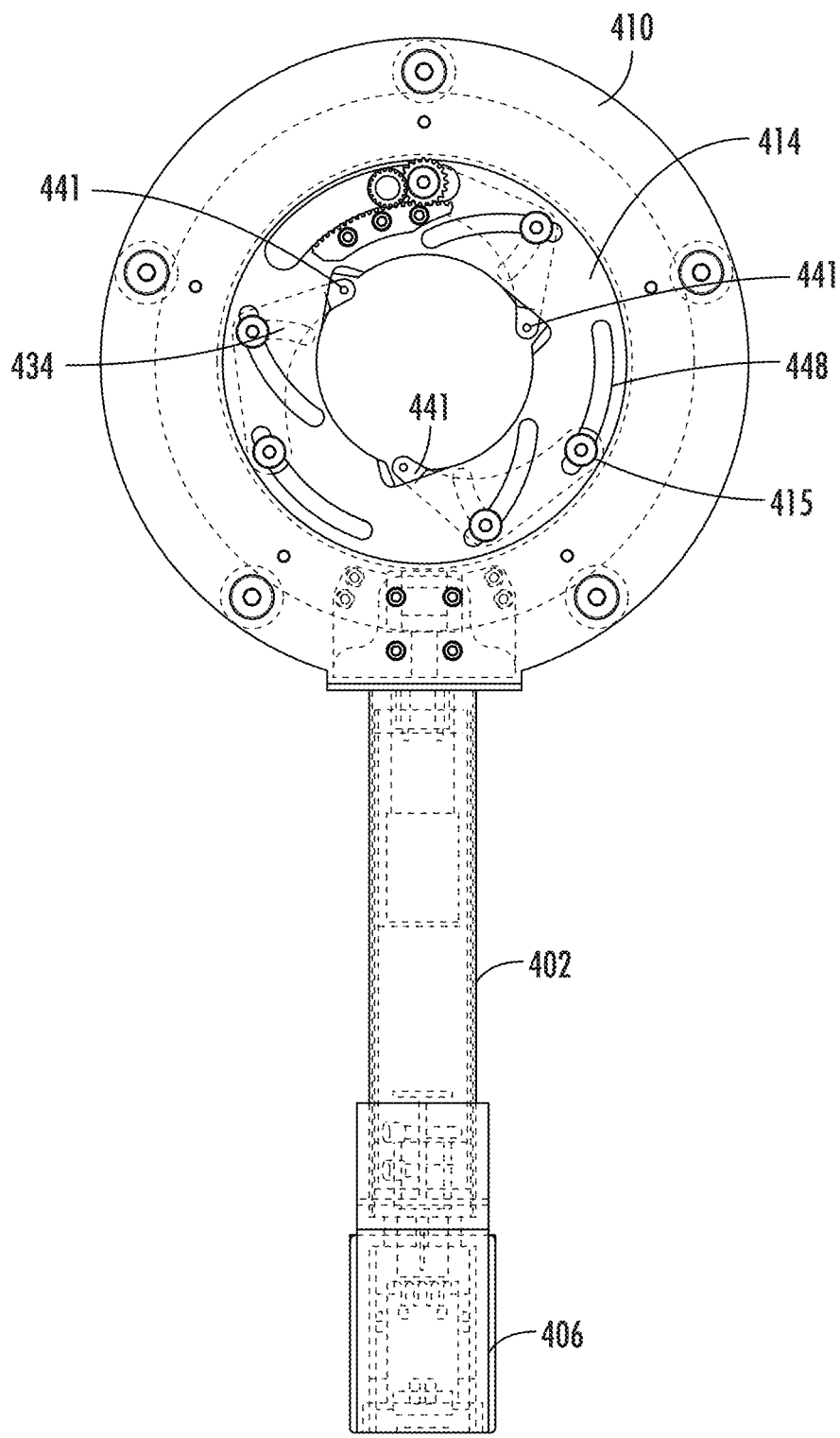
FIG. 18 is a back view of the smart welding positioner.
Figure 19A:
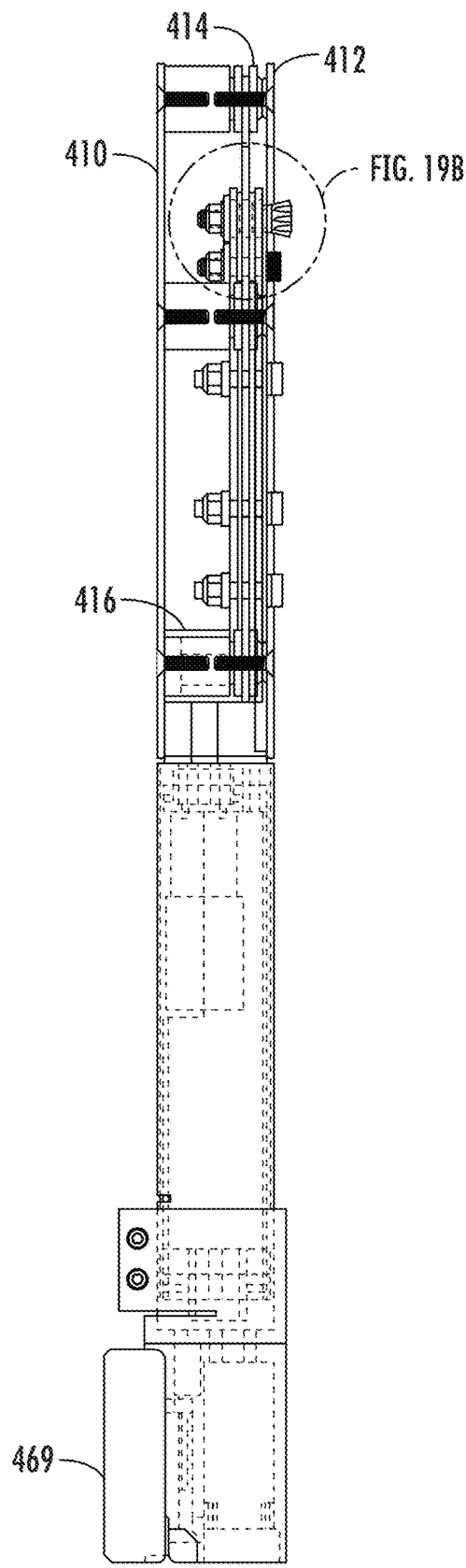
FIG. 19A is a left side view of the smart welding positioner.
Figure 19B:
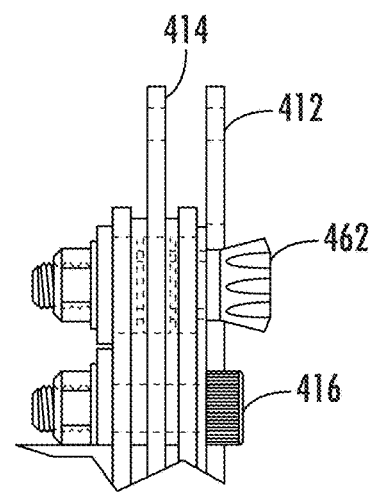
FIG. 19B is an enlarged view of Section D in FIG. 19A.

Referring to FIG. 15F-FIGS. 15H, a pawl retainer 471 (upper or lower) is illustrated. The pawl retainer 471 may include a keyed ratchet shaft 473, a bearing 475, such as a one-way clutch bearings or sprag style bearing, a keyed cam disk drive gear 477 and clutch internal parts 479, pawl 481, pawl spring 483, and pawl shaft 487.

FIGS. 15I-15L illustrate Sprag and Pawl assembly 485, shown without pawl retainers and disc. The disc may house the Chuck ratchet assembly.

Referring back to FIG. 1, the smart welding system 10 preferably includes a purge plug 500. The purge plug 500 comprises an integrated oxygen sensor 502 for monitoring and maintaining the status of the purge. The oxygen sensor 502 controls a solenoid valve inside of a regulator.

Figure 21:
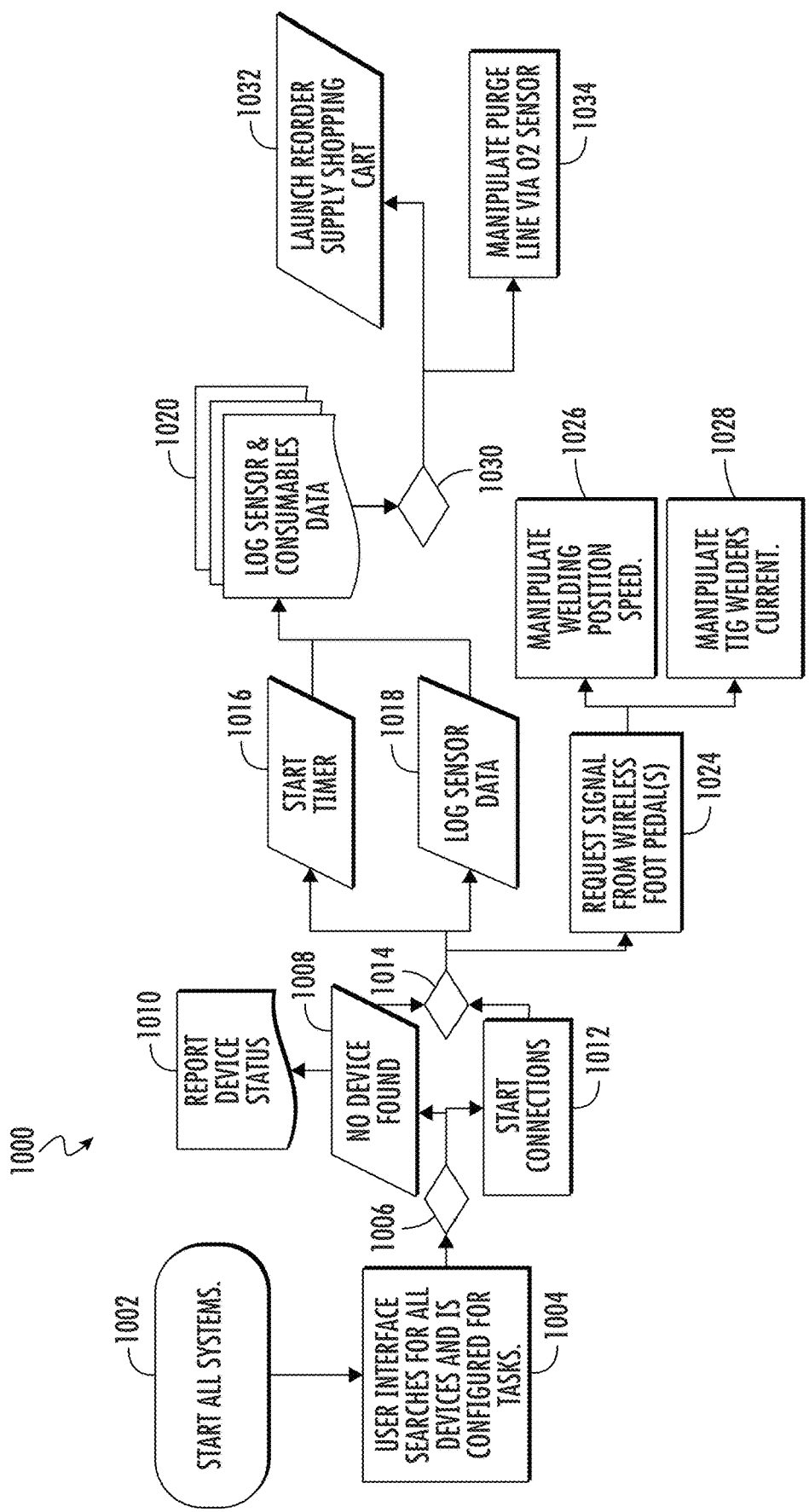
FIG. 21 is an illustrative example of a smart welding operation, or process.
Figure 22:
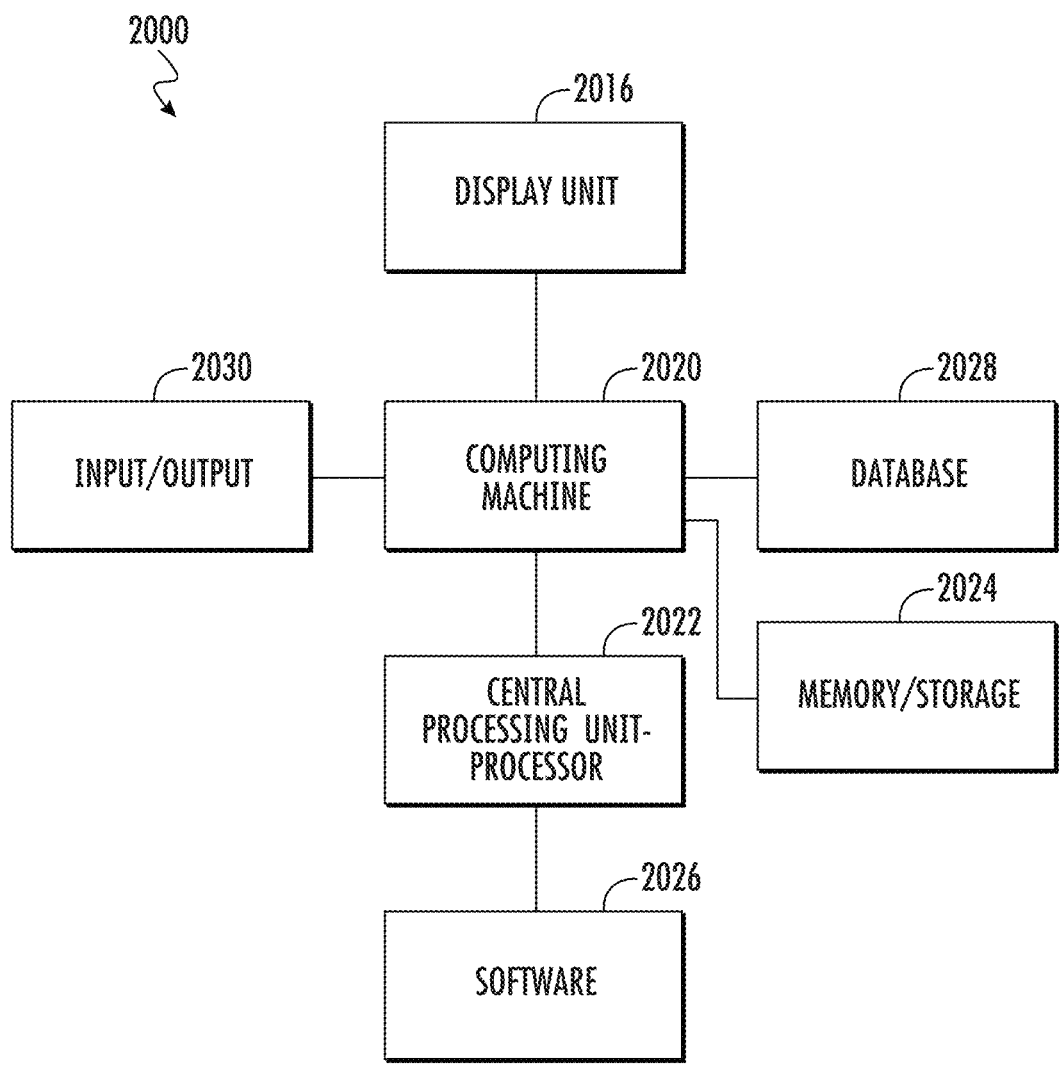
FIG. 22 is an illustrative example of a computing system used in the smart welding operation or smart welding system.
Figure 23:
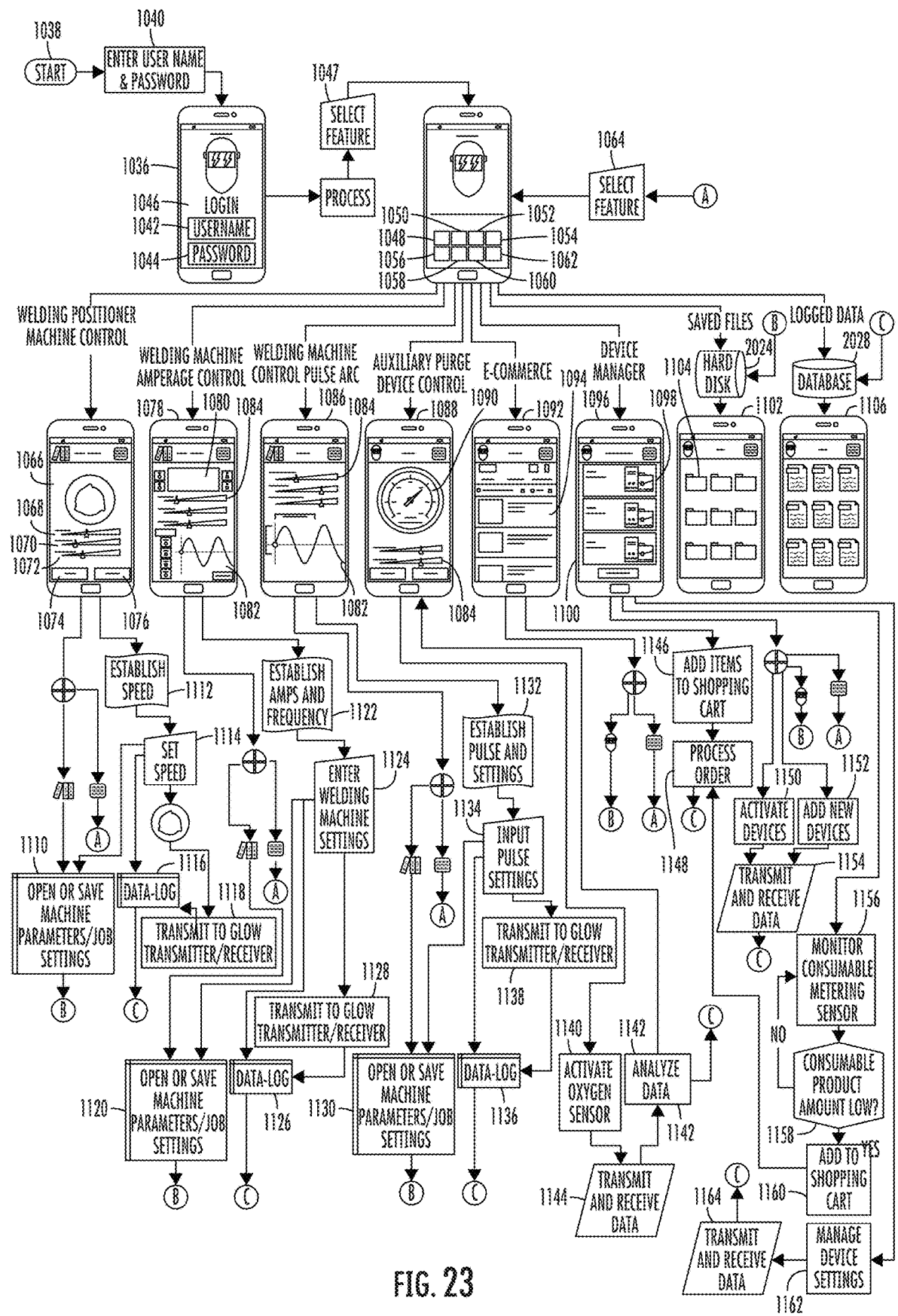
FIG. 23 illustrates several graphical user interfaces associated with the smart welding process.

Referring to FIGS. 21-23, an illustrative embodiment of a welding system operation process, referred to generally as smart welding operation, or process, 1000, which integrates technology to increase performance and safety in welding operations is shown. The smart welding operation 1000 uses one or more components (devices) of the smart welding system 10. The smart welding operation 1000 may be initiated by a user starting one or more components of the smart welding system 10, 1002. A user interface may be used to search for all devices associated with the smart welding system 10, and is configured for the desired tasks, see step 1004. The smart welding operation 1000 may be configured to check for one or more component connections 1006. If no components are found, 1008, a device status may be reported, 1010, or connections to the smart welding system 10 components may be initiated, 1012. The user may initiate several functions with one or more components of the smart welding system 10, see step 1014, such as, but not limited to, start a timer, log data, such as sensor data, 1018, or consumables data, 1020, or manipulate one or more smart welding system 10 actions, such as request signal from foot pedals 200, see step 1024. The actions taken in step 1024 may result in a functional action, such as manipulation of the welding positioner 400 speed or manipulation, see step 1026 of the welding machine 102 current, see step 1028. The data obtained in step 1018 or 1020 may be further processes 1030 to perform additional functions, such as initiating a reorder of supplies, see step 1032, or manipulation of purge sensors via $O_2$ sensor, see step 1034.

The smart welding system 10 may include one or more computing systems which contain the necessary hardware and software to carry out one or more functions of the individual components/devices, or as part of the smart welding operation 1000. FIG. 22 provides an embodiment of an illustrative example of a computing system 2000. The computing system 2000 may include a computer 2020, or other electronic device, having one or more of the following: a processor 2022, memory/storage 2024, software 2026, and any other hardware necessary to perform all functions. The memory/storage 2024 and/or software 2026 may include the necessary instructions for the smart welding system 10 and/or the functioning of the smart welding operation 1000. The processor 2022 may include a general purpose central processing unit (s), application specific processors, and logic devices, as well as any other type of processing device, or combinations or variations thereof. Instructions for the smart welding system 10 and/or the functioning of the smart welding operation 1000 can direct the processor 2022 to carry out any of the processes described herein.

The memory/storage 2024 may include any computer readable storage media readable by the processor 2022 and capable of storing software 2026, including instructions for the smart welding system 10 and/or the smart welding operation 1000 functioning or operations. The memory/storage 2024 may include volatile and non-volatile, removable and non-removable media, implemented in any method or technology for storage of information, such as computer readable instructions, data structures, program modules, or other data. Illustrative examples of the memory/storage 2024 may include storage media, including random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of transitory propagated signals. In addition to storage media, in some implementations, the memory/storage 2024 may also include communication media over which software may be communicated internally or externally. The memory/storage 2024 may be implemented as a single storage device, but may also be implemented across multiple storage devices or sub-systems co-located or distributed relative to each other.

The computing system 2000 thereof may further include one or more database (s) 2028. The computing system 2000 may include Input/Output devices 2030, such as a keyboard, mouse, joystick, light pen, scanner, touchscreen. A display unit 2016 may include a monitor or a visual display unit, such as an LCD monitor. The computing system 2000 may be configured as a single stand-alone unit.

Alternatively, the computing system 2000 may be part of a network of connected computer systems or other computing machines, including as part of servers or cloud based computing systems. The computing system 2000 may be a single desktop computer, a laptop computer, a tablet, a phone, a server, or any other machine capable of executing a set of instructions (sequential or otherwise) that specify actions to be taken by that machine, as well as multiple machines that individually or jointly execute a set (or multiple sets) of instructions to perform any one or more of the methods described herein.

Referring to FIG. 23, one or more functions associated with the smart welding system 10 and/or the smart welding operation/process 1000 is shown via use through a smart device, such as a smart phone 1036, such as an APPLE IPHONE. Such functionality allows the user the ability to operate various functions or processes remotely, or in a wireless manner. A user may start the process, 1038, by entering 1040, or typing in a user name 1042 and password 1042 in a smart cell phone graphical user interface 1046. Once the user name 1042 and password 1044 have been entered, the user can perform one or more functions by selecting function icons 1047, such as "Rotary Positioning" 1048, "Welding Positioning" 1050, "Pulse Arc" 1052, "Supply Store" 1054, "Files" 1056, "Aux Purge" 1058, "Pedal" 1060, and "App Setting" 1062. The user may select any icon 1064, directing them to additional graphical interfaces and function capabilities or control.

In graphical interface 1066, Welding Positioner Machine Control, the user may control or start the welding position functions, such as 1068, 1070, or 1072. Once selected, the user can start the welding positioning with the desired functions by selecting "run" 1074 or "reset" 1076. In graphical interface 1078, for use with manipulation of the welding machine amperage control, the graphical interface 1078 may include graphs 1080 or 1082 for illustrating information and one or more slide bars 1084 for ease of changing parameters. In graphical interface 1086, welding machine control pulse arc, the graphical interface 1086 may include graphs 1082 for illustrating information and one or more slide bars 1084 for ease of changing parameters. In graphical interface 1088, Auxiliary Purge Device Control 1088 may include virtual dial 1090 for illustrating information about oxygen levels and one or more slide bars 1084 for ease of changing parameters, such as oxygen flow. In graphical interface 1092, E-commerce, the user may be able to directly order various parts. To aid in this process, the graphical interface 1092 may also include part descriptions with part photographs 1094. In graphical interface 1096, device management, the user may be able to view status or other information related to the components of the smart welding system 10, such as the smart foot pedal icon 1098 or purge plug icon 1100. In graphical interface 1102, saved files (for example, from hard drive 2024), the user may be able to access one or more files 1104. In graphical interface 1106, logged data, the user may be able to access obtained data from databases icon 1108, 2028.

Using the graphical interface 1066, Welding Positioner Machine Control, the user may open or save machine parameters/job settings, 1110, establish welding positioner speed 1112, set speed 1114, log data 1116 related to the welding positioner, or transmit/receive data 1118 as needed.

Using the graphical interface 1078, for use with manipulation of the welding machine amperage control, the user may open or save machine parameters/job settings 1120, establish amps and frequency 1122, enter welding machine settings 1124, log data 1126 related to the welding machine amperage, or transmit/receive data 1128 as needed.

Using graphical interface 1086, welding machine control pulse arc, the user can open or save machine parameters/job settings 1130, establish pulse are settings 1132, input pulse settings 1134, log data 1136 related to the welding machine pulse arc, or transmit/receive data 1138 as needed.

Using the graphical interface 1088, Auxiliary Purge Device Control, the user can activate an oxygen sensor 1140, analyze data 1142, and transmit/receive data 1144 as needed. Using the graphical interface 1092, E-commerce, the user may find items for purchase, add such items to a shopping cart 1146 and process orders 1148.

Using the graphical interface 1096, device management, the user may activate devices 1150, add new devices 1152, transmit/receive data 1154 as needed, monitor consumable metering sensors 1156, determine if consumable product amount is low 1158, and if yes, add the product to the shopping cart 1160.

The user may also manage device settings 1162 and transmit/receive such data 1164.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A smart welding system comprising:
    a welding station comprising a welding machine;
    a smart receiver system constructed and arranged for wireless communications and data acquisition, said smart receiver system comprising a housing unit having an interior having at least a micro processing board for processing data, a digital potentiometer, and a wireless module for receiving or transmitting wireless signals;
    a smart welding positioner configured to provide the user the capability of fixturing and rotating bent, or non-bent, sections of tubing, said smart welding positioner wirelessly connected to a smart foot pedal, said smart welding positioner comprising an elongated body having a first end, a second, opposing end, a through-hole rotary welding positioner head assembly at said first end, wherein said through-hole rotary welding positioner head assembly comprises a plurality of pipe engaging members rotatably attached to a first outer disc or to a second outer disc, a motor housed within said elongated body, and an electronics housing mounted to said second end, said electronics housing comprising one or more electrical components that drive functionality;
    said smart foot pedal operatively connected to said smart welding positioner and constructed and arranged to wirelessly interact with and control said smart welding positioner.

2. The smart welding system according to claim 1, further comprising a smart purge plug.

3. The smart welding system according to claim 1, wherein said welding station is a TIG welding station.

4. The smart welding system according to claim 1, wherein said wireless communication is via BLUETOOTH.

5. The smart welding system according to claim 1, wherein said wireless communication is via WIFI.

6. The smart welding system according to claim 2, wherein said purge plug comprises an integrated oxygen sensor for monitoring and maintaining a status of an oxygen purge.

7. The smart welding system according to claim 1, wherein said through-hole rotary welding positioner head assembly comprises said first outer disc, said second outer disc, and an inner disc positioned in-between said first outer disc and said second outer disc.

8. The smart welding system according to claim 1, wherein said electronics housing comprises a microprocessor, a wireless receiver and transmitter, and a pulse width modulation speed controller.

9. The smart welding system according to claim 1, wherein said smart welding positioner includes an adjustable arm secured to said elongated body.

10. The smart welding system according to claim 1, wherein said smart welding positioner includes an adjustable arm support structure.

11. The smart welding system according to claim 1, wherein said smart welding positioner further includes a copper sheet metal ground circuit.

12. The smart welding system according to claim 1, wherein said smart welding positioner head assembly includes a sprag and pawl assembly.

13. The smart welding system according to claim 1, wherein said smart welding positioner is programmable via a computer or smart device application.

14. The smart welding system according to claim 1, wherein said smart welding positioner is constructed and arranged to be controllable via dynamic speed control.

15. The smart welding system according to claim 1, wherein said smart welding positioner further includes a gear assembly.

16. The smart welding system according to claim 15, wherein said smart welding positioner includes a pawl and ratchet.

17. The smart welding system according to claim 1, wherein said smart foot pedal is operatively connected to said smart welding station and constructed and arranged to wirelessly interact with and control one or more components of said welding station.

* * * * *